US009239417B2

(12) United States Patent
Wolk et al.

(10) Patent No.: US 9,239,417 B2
(45) Date of Patent: Jan. 19, 2016

(54) ILLUMINATION DEVICE HAVING VISCOELASTIC LAYER

(75) Inventors: Martin B. Wolk, Woodbury, MN (US); Michael J. Sykora, New Richmond, WI (US); Robert L. Brott, Woodbury, MN (US); William J. Bryan, Mahtomedi, MN (US); Erik A. Aho, North Saint Paul, MN (US); Martin Kristoffersen, Porsgrunn (NO); Michael A. Meis, Stillwater, MN (US); Kevin R. Schaffer, Woodbury, MN (US); Audrey A. Sherman, St. Paul, MN (US); John C. Schultz, Afton, MN (US); Mieczyslaw H. Mazurek, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 710 days.

(21) Appl. No.: 13/577,692

(22) PCT Filed: Feb. 9, 2011

(86) PCT No.: PCT/US2011/024130
§ 371 (c)(1),
(2), (4) Date: Mar. 18, 2013

(87) PCT Pub. No.: WO2011/100277
PCT Pub. Date: Aug. 18, 2011

(65) Prior Publication Data
US 2013/0170218 A1     Jul. 4, 2013

Related U.S. Application Data

(60) Provisional application No. 61/303,152, filed on Feb. 10, 2010.

(51) Int. Cl.
*F21V 8/00* (2006.01)
*B82Y 20/00* (2011.01)

(52) U.S. Cl.
CPC .............. *G02B 6/0001* (2013.01); *G02B 6/005* (2013.01); *G02B 6/0065* (2013.01); *B82Y 20/00* (2013.01); *G02B 6/0036* (2013.01); *G02B 6/0051* (2013.01); *Y10S 977/78* (2013.01)

(58) Field of Classification Search
USPC .......... 362/618, 627, 326, 330, 336, 337, 339
See application file for complete search history.

(56) References Cited

U.S. PATENT DOCUMENTS 2,736,721 A     2/1956   Dexter
4,554,324 A    11/1985   Husman
(Continued)

FOREIGN PATENT DOCUMENTS

EP     0 291 206     11/1988
EP     1 724 621     11/2006
(Continued)

OTHER PUBLICATIONS

"Viscoelasticity", Wikipedia, Apr. 3, 2011, XP002632358, [retrieved from the Internet on Apr. 11, 2011]., -URL:<http://en.wi ki pedi a.org/wi ki/Viscoelasticity> 9 pgs.

*Primary Examiner* — Laura Tso
(74) *Attorney, Agent, or Firm* — Clifton F. Richardson

(57) ABSTRACT

An illumination device, such as a backlight for electronic display devices, is disclosed. The illumination device includes a lightguide optically coupled to a light source, and a viscoelastic layer and a nanovoided polymeric layer are used in conjunction with the lightguide to manage light emitted by the light source. The viscoelastic layer may be a pressure sensitive adhesive.

19 Claims, 4 Drawing Sheets

(56) References Cited

U.S. PATENT DOCUMENTS

| | | |
|---|---|---|
| 4,737,559 A | 4/1988 | Kellen |
| 5,066,098 A | 11/1991 | Kult |
| 5,214,119 A | 5/1993 | Leir |
| 5,506,279 A | 4/1996 | Babu |
| 5,510,171 A | 4/1996 | Faykish |
| 5,784,197 A | 7/1998 | Frey |
| 5,825,543 A | 10/1998 | Ouderkirk |
| 5,828,488 A | 10/1998 | Ouderkirk |
| 5,867,316 A | 2/1999 | Carlson |
| 5,882,774 A | 3/1999 | Jonza |
| 6,033,604 A | 3/2000 | Lundin |
| 6,049,649 A | 4/2000 | Arai |
| 6,083,856 A | 7/2000 | Joseph |
| 6,096,066 A | 8/2000 | Chen |
| 6,111,696 A | 8/2000 | Allen |
| 6,179,948 B1 | 1/2001 | Merrill |
| 6,280,822 B1 | 8/2001 | Smith |
| 6,288,172 B1 | 9/2001 | Goetz |
| 6,288,842 B1 | 9/2001 | Florczak |
| 6,352,761 B1 | 3/2002 | Hebrink |
| 6,367,941 B2 | 4/2002 | Lea |
| 6,368,699 B1 | 4/2002 | Gilbert |
| 6,569,521 B1 | 5/2003 | Sheridan |
| 6,663,978 B1 | 12/2003 | Olson |
| 6,827,886 B2 | 12/2004 | Neavin |
| 6,845,212 B2 | 1/2005 | Gardiner |
| 6,927,900 B2 | 8/2005 | Liu |
| 6,972,813 B1 | 12/2005 | Toyooka |
| 6,991,695 B2 | 1/2006 | Tait |
| 7,046,905 B1 | 5/2006 | Gardiner |
| 7,090,922 B2 | 8/2006 | Zhou |
| 7,140,741 B2 | 11/2006 | Fleming |
| 7,165,959 B2 | 1/2007 | Humlicek |
| 7,224,529 B2 | 5/2007 | King |
| 7,255,920 B2 | 8/2007 | Everaerts |
| 7,315,418 B2 | 1/2008 | DiZio |
| 7,336,422 B2 | 2/2008 | Dunn |
| 7,361,474 B2 | 4/2008 | Siegler |
| 7,481,563 B2 | 1/2009 | David |
| 7,498,535 B2 | 3/2009 | Blake |
| 7,995,278 B2 | 8/2011 | Endle |
| 8,378,046 B2 | 2/2013 | Determan |
| 2003/0034445 A1 | 2/2003 | Boyd |
| 2005/0070976 A1 | 3/2005 | Samuel |
| 2006/0056166 A1 | 3/2006 | Yeo |
| 2006/0084780 A1 | 4/2006 | Hebrink |
| 2006/0216524 A1 | 9/2006 | Klun |
| 2006/0226561 A1 | 10/2006 | Merrill |
| 2007/0006493 A1 | 1/2007 | Eberwein |
| 2007/0026167 A1 | 2/2007 | Bourdelais |
| 2007/0031641 A1 | 2/2007 | Frisch |
| 2007/0047080 A1 | 3/2007 | Stover |
| 2007/0081254 A1 | 4/2007 | Endle |
| 2007/0110960 A1 | 5/2007 | Frey |
| 2007/0209244 A1 | 9/2007 | Prollius |
| 2007/0242356 A1 | 10/2007 | Thakkar |
| 2007/0279391 A1 | 12/2007 | Marttila |
| 2008/0053800 A1 | 3/2008 | Hoyle |
| 2008/0062688 A1 | 3/2008 | Aeling |
| 2008/0074901 A1 | 3/2008 | David |
| 2008/0084518 A1 | 4/2008 | Brott |
| 2008/0130126 A1 | 6/2008 | Brooks |
| 2008/0232135 A1 | 9/2008 | Kinder |
| 2009/0067151 A1 | 3/2009 | Sahlin |
| 2010/0031689 A1 | 2/2010 | Berghoff |
| 2010/0103528 A1 | 4/2010 | Endle |
| 2011/0039099 A1 | 2/2011 | Sherman |
| 2011/0109965 A1 | 5/2011 | Gates |
| 2011/0123800 A1 | 5/2011 | Sherman |
| 2011/0176325 A1 | 7/2011 | Sherman |
| 2013/0011608 A1 | 1/2013 | Wolk |

FOREIGN PATENT DOCUMENTS

| | | |
|---|---|---|
| EP | 2 020 614 | 2/2009 |
| EP | 2 028 412 | 2/2009 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 99/36248 | 7/1999 |
| WO | WO 99/36262 | 7/1999 |
| WO | WO 99/42536 | 8/1999 |
| WO | WO 02/070237 | 9/2002 |
| WO | WO 2006/125174 | 11/2006 |
| WO | WO 2007/075518 | 7/2007 |
| WO | WO 2007/092152 | 8/2007 |
| WO | WO 2008/016978 | 2/2008 |
| WO | WO 2008/022007 | 2/2008 |
| WO | WO 2008/045200 | 4/2008 |
| WO | WO 2008/060731 | 5/2008 |
| WO | WO 2008/076612 | 6/2008 |
| WO | WO 2008/121475 | 10/2008 |
| WO | WO 2009/057844 | 5/2009 |
| WO | WO 2009/058513 | 5/2009 |
| WO | WO 2009/061673 | 5/2009 |
| WO | WO 2009/089137 | 7/2009 |
| WO | WO 2009/114683 | 9/2009 |
| WO | WO 2010/005810 | 1/2010 |
| WO | WO 2010/006102 | 1/2010 |
| WO | WO 2010/017087 | 2/2010 |
| WO | WO 2010/021140 | 2/2010 |
| WO | WO 2010/033571 | 3/2010 |
| WO | WO 2010/048416 | 4/2010 |
| WO | WO 2010/120468 | 10/2010 |
| WO | WO 2010/120864 | 10/2010 |
| WO | WO 2011/088161 | 7/2011 |
| WO | WO 2011/088216 | 7/2011 |
| WO | WO 2012/027377 | 3/2012 |
| WO | WO 2012/061296 | 5/2012 |

ILLUMINATION DEVICE HAVING VISCOELASTIC LAYER

CROSS REFERENCE TO RELATED APPLICATIONS

This application is a national stage filing under 35 U.S.C. 371 of PCT/US2011/024130, filed Feb. 9, 2011, which claims priority to Provisional Application No. 61/303,152, filed Feb. 10, 2010, the disclosure of which is incorporated by reference in its/their entirety herein.

FIELD

This disclosure relates to illumination devices, particularly illumination devices that can be used as backlight assemblies in electronic display devices.

BACKGROUND

Electronic display devices, such as liquid crystal display (LCD) devices, are used in a variety of applications including computer monitors, televisions, hand-held devices, digital still cameras, video cameras. In a typical LCD device, an LCD panel is backlit by one or more linear or point light sources which are optically coupled to the panel such that images are generated. Light sources can be optically coupled to an LCD panel using an arrangement of optical substrates or films including a lightguide, diffuser films, brightness enhancing films, multilayer optical films and the like. LCD devices are often manufactured using a backlight assembly including one or more light sources optically coupled to a suitably designed arrangement of optical films, both of which are contained in a housing that can be joined with an LCD panel.

SUMMARY

An illumination device is disclosed herein, comprising a light source optically coupled to a lightguide such that light emitted by the light source enters the lightguide and is transported within the lightguide by total internal reflection. The lightguide is a component of an optical article that further comprises a viscoelastic layer and a nanovoided polymeric layer comprising a plurality of interconnected nanovoids. In some embodiments, the optical article comprises the lightguide disposed between the viscoelastic layer and the nanovoided layer. In some embodiments, the interface formed between the viscoelastic layer and the nanovoided layer comprises a plurality of features.

In some embodiments, the optical article comprises a first viscoelastic layer disposed on the lightguide, a second viscoelastic layer disposed on the lightguide opposite the first viscoelastic layer, and a first nanovoided polymeric layer disposed on the first viscoelastic layer opposite the lightguide.

In some embodiments, the optical article comprises: a light emitting layer adhered to the lightguide with a first viscoelastic layer with an interface between the two layers comprising elongated lenses; and a microstructured nanovoided polymeric layer adhered to the opposite surface of the lightguide with a second viscoelastic layer with an interface between the lightguide and the layer comprising a plurality of elongated lenses. In some embodiments, the elongated prisms extend orthogonal to the elongated lenses.

In some embodiments, the optical article further comprises an adhesive layer disposed on an outer surface of the optical article, with an optional release liner used to protect the adhesive layer when not in use.

BRIEF DESCRIPTION OF DRAWINGS

Advantages and features of the invention may be more completely understood by consideration of the following figures in connection with the detailed description provided below. The figures are schematic drawings of various optical articles and are not necessarily drawn to scale.

DETAILED DESCRIPTION

Figure 1:
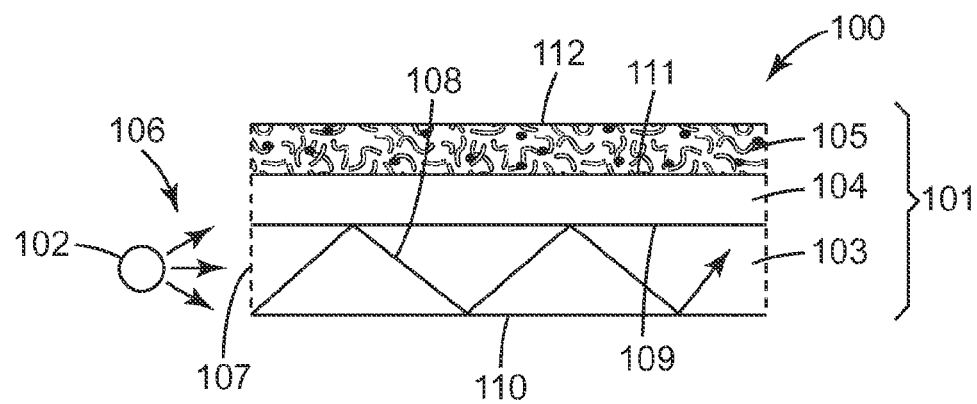
FIG. 1 shows an embodiment of the illumination device disclosed herein.

This disclosure relates to the following for which the disclosures are incorporated by reference herein: U.S. Provisional Application No. 61/303,152 (Wolk et al.) filed on Feb. 10, 2010; PCT Application Nos. US2011/021140 and US2011/021053 both filed Jan. 13, 2011; and WO 2010/017087 A2 (Sherman et al.).

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

This invention describes high angle backlights (HABLs) comprising microreplicated low index materials and optically clear adhesives. HABLs are an integral part of temporally multiplexed 3D LCD displays based on 3M™ 3D film. Described are structured lightguides in which one or both major surfaces have structural optical elements such as lenses, prisms, or other extraction features. The geometry of the extraction features on the bottom surface and lenses on the top surface of an HABL is designed so that light injected into one side of the guide is emitted from the top surface at a prescribed angle (usually 70° with 90% of the energy within ±10°) into the half-hemispheres above the guide opposite the injection side. Several embodiments are described including a number of alternative constructions. A proposed article comprises: a solid of low haze and high transparency with two major surfaces (a lightguide), a low index nanofoam (a nanovoided polymeric layer), and a viscoelastic layer disposed between the lightguide and the nanovoided polymeric layer, wherein at least one major surface of the lightguide is coincident with a structured surface of the viscoelastic layer, and a light source is configured to inject light into the lightguide. Processes that may be employed to fabricate HABLs are described in PCT Application No. US2011/021140 filed Jan. 13, 2011.

The proposed backlight composite assemblies integrate films and functions that are currently separate. The constructions of the proposed backlight composite assemblies are simpler, so their fabrication may be cost effective. Finally, the embedded optical structures of the assembly may result in improved durability of the backlights.

The illumination device disclosed herein includes a light source that emits light, and the light is managed by an optical article comprising a lightguide, a viscoelastic layer and a nanovoided polymeric layer. The illumination device may provide one or more advantages. For example, the viscoelastic layer may comprise a PSA which is generally tacky at room temperature. A tacky layer may facilitate assembly of various product constructions because a separate adhesive layer may not be needed for bonding a component to the illumination device or article.

The illumination device may be used to provide light anywhere it is desired. The illumination device may be designed for interior and/or exterior use, including household, commercial and/or industrial use. The illumination device may be used and/or provided in a construction so that it is portable, i.e., it is a portable source of light. Lighted tapes, signs, labels, stickers, cut-outs, etc. are examples of portable constructions that may be made using the illumination device. The illumination device may also be used and/or provided in a more stationary construction such as in an electronic display device.

The illumination device may also be used to provide "light on demand", e.g., the light source may be activated only under certain conditions such as when parking a vehicle. The illumination device may be used to provide exterior lighting of a vehicle, e.g., for tail lights, replacing tail light cavities and their lighting assemblies and which are very space consuming.

The optical article can be used in place of a conventional lightguide used to light display devices. For example, the optical article may be used to replace a solid or hollow lightguide that distributes light from one or more substantially linear or point light sources. The optical article can be assembled in a display device without the need for additional materials to bond the lightguide to the display device.

The illumination device may also be very adaptable, even by a user, so that it can be used in different lighting forms and constructions. For example, the optical article may be provided in roll or sheet form such that it can be cut into various shapes and sizes. The light source may also be interchangeable with the optical article, for example, if the light source should become unusable or if a different color of light is desired. Further, if used in a sign construction, graphics can be interchanged, for example, if one would like to update an advertisement.

The illumination device may provide many more advantages. The illumination device can be used to provide light that is bright, diffuse, uniform and/or concentrated over particular areas. The illumination device may provide advantages by being thin, flexible (can be flexed by hand) and/or lightweight, and it may even be conformable to a particular shape and size. The optical article may be tiled to light large areas which may be made easier if the optical articles can be stuck together. Due to its viscoelastic properties, the viscoelastic layer may dampen stresses experienced by the illumination device or construction in which the device is used. The optical article, when disposed on a substrate, may be removable and/or repositionable over time. The illumination device may also provide advantages related to cost, because it can be made from commercially available light sources and materials. Additional advantages are described below.

The behavior of light with respect to the illumination devices and articles disclosed herein can be described using principles of geometric optics. These principles are well known and are not presented here; a more detailed description can be found in the Sherman et al. reference cited above. In general, one may apply the law of refraction and the principle of total internal reflection in conjunction with ray tracing techniques to determine theoretically how varying three dimensional structure, material composition, layer construction, angular distribution of light, etc. can affect the behavior of light for the illumination devices and articles disclosed herein.

FIG. 1 shows an exemplary illumination device 100 comprising optical article 101 and light source 102. Optical article 101 comprises viscoelastic layer 104 disposed on lightguide 103, and nanovoided polymeric layer 105 disposed on viscoelastic layer 104 opposite lightguide 103. Light source 102 is positioned relative to lightguide 103 such that light emitted by the light source enters the lightguide and is transported within the lightguide by total internal reflection. Light emitted by the light source is represented by rays 106 which enter lightguide 103 through input surface 107 adapted to receive light from the light source. Light within the lightguide is represented by single ray 108 which is transported by total internal reflection. At least a portion of the lightguide has an optically smooth surface 109 and/or 110. Interface 109 is formed between lightguide 103 and viscoelastic layer 104. Interface 111 is formed between viscoelastic layer 104 and nanovoided polymeric layer 105, and the nanovoided polymeric layer comprises upper surface 112.

An optically smooth surface, as used herein, means that the surface is smooth enough such that light incident upon the surface is not affected undesirably by the surface, e.g., the surface is free of defects having at least one dimension larger than the wavelength of the incident light. The optically smooth surface allows at least some of the light entering the lightguide to be reflected at the surface such that this light continues to propagate within the layer according to the principle of total internal reflection.

In general, light propagating within the lightguide is either reflected or extracted from the lightguide. For reflection of light incident on an optically smooth surface, the observed reflection angle is within about 10° of the calculated reflection angle. Likewise, for refraction of light incident on an optically smooth surface, the observed transmittance angle is within about 10° of the calculated transmittance angle. Total internal reflection occurs if a predetermined amount, or at least within about 10% of a predetermined amount, of light does not escape the lightguide unless it is intentionally extracted from the lightguide.

In general, the surfaces of the lightguide may be unstructured as shown in FIG. 1, or they may have any three-dimensional structure depending on the desired effect. In general, a surface of the lightguide may comprise at least one feature that extends along a portion of the surface and is oriented to extract light from the lightguide. In some embodiments, the at least one feature comprises a plurality of features, the features comprising protrusions, depressions, or a combination thereof. Exemplary features comprise protrusions and/or depressions having lenticular, prismatic, ellipsoidal, conical, parabolic, pyramidal, square, or rectangular shapes, or a combination thereof. Features comprising lenses are particularly useful for directing light to a preferred angular distribution. Exemplary features comprising linear prisms or elongated prisms are also particularly useful. Other exemplary features comprise protrusions and/or depressions having elongated, irregular, variably sloped lenticular, or random columnar shapes, or a combination thereof. Hybrids of any combination of shapes may be used, for example, elongated parabolic, pyramidal prismatic, rectangular-based prismatic, and rounded-tip prismatic shapes. The features may comprise random combinations of shapes.

Sizes of the features may be described by their overall shapes in three dimensions. In some embodiments, each feature may have a dimension of from about 1 to about 100 um, for example, from about 5 to about 70 um. A lightguide may have features that are all the same shape, but the sizes of the shapes may vary in at least one dimension. A lightguide may also have features that are different shapes, and the sizes of these features may or may not vary in any given dimension.

Surface structures of the features may also be varied. Surface structure of a feature generally refers to the sub-structure of the feature. Exemplary surface structures include optically smooth surfaces, irregular surfaces, patterned surfaces, or a combination thereof. For a lightguide having a plurality of features, each of the features may have the same surface structure. For a lightguide having a plurality of features, some of the features may have the same surface structure. For a lightguide having a plurality of features, each of the features may have a different surface structure. The surface structure of a feature may vary over portions of the feature.

An optically smooth surface of a feature may form part of the optically smooth surface of the lightguide. The optically smooth surfaces of the feature and the lightguide may be continuous or discontinuous with each other. If a plurality of features is used, the surfaces of some extracting features may be completely optically smooth or some may be partially optically smooth. The optically smooth surface may be in contact with an adjacent lightguide or substrate on which the lightguide is disposed.

The number of features, if used, for a given lightguide is at least one. A plurality of features, meaning at least two, may also be used. In general, any number of features may be included, e.g., 0, 1, 2, 3, 4 or 5 features; greater than 1, greater than 10, greater than 20, greater than 30, greater than 40, greater than 50, greater than 100, greater than 200, greater than 500, greater than 1000, or greater than 2000 features; or from about 1 to about 10, from about 1 to about 20, from about 1 to about 30, from about 1 to about 40, from about 1 to about 50, from about 1 to about 100, from about 1 to about 200, from about 1 to about 500, from about 1 to about 1000, or from about 1 to about 2000 features.

The features may be randomly arranged, arranged in some type of regular pattern, or both. The distance between features may also vary. The features may be discreet or they may overlap. The features may be arranged in close proximity to one another, in substantial contact with each other, immediately adjacent each other, or some combination thereof. A useful distance between features is up to about 10 um, or from about 0.05 um to about 10 um. The features may be offset with respect to one another, angularly as well as transversely. The areal density of the features may change over the length, width, or both.

The features may be arranged to obtain a desired optical effect. The features may be arranged to extract light uniformly or as a gradient from the lightguide, to hide discrete light sources, or to reduce Moiré.

The features may be used to control the amount and/or direction of light extracted from the lightguide. This can be carried out generally by varying the shape, size, surface structure, and/or orientation of the features. If a plurality of features is used, then the number and/or arrangement of the features may be varied, as well as the orientation of the features relative to each other.

In general, one may determine theoretically how varying the orientation of each feature can affect the amount and distribution of light that may be extracted from the lightguide. This may be carried out using ray tracing techniques consistent with the law of refraction and the principle of total internal reflection.

The shape of a feature may change the angular component of light which can increase or decrease the amount of light extracted from the lightguide. This may be the case if light propagates by total internal reflection within the lightguide and strikes a surface of a feature at an angle less than, equal to, or greater than the critical angle for the lightguide and air and/or an adjacent substrate(s). The amount of light extracted from the lightguide may increase or decrease accordingly.

The size of a feature may be changed such that more or less light can reflect off a surface of the feature, thus increasing or decreasing the amount of light extracted from the lightguide.

The surface structure of a feature may be used to control the distribution of light that is extracted from the lightguide. Light having a particular angular distribution may strike a feature and be extracted uniformly and/or randomly from the lightguide. Light may also be extracted uniformly and in a pattern, or randomly and in a pattern.

Figure 2A:
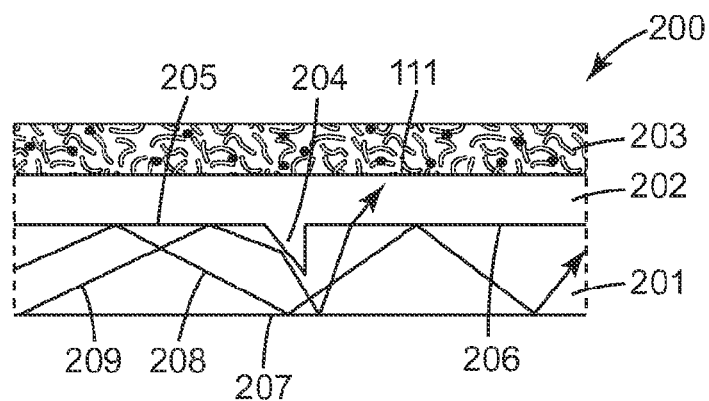
FIGS. 2a and 2b show schematic cross sections of exemplary optical articles that may used in the illumination device disclosed herein.
Figure 2B:
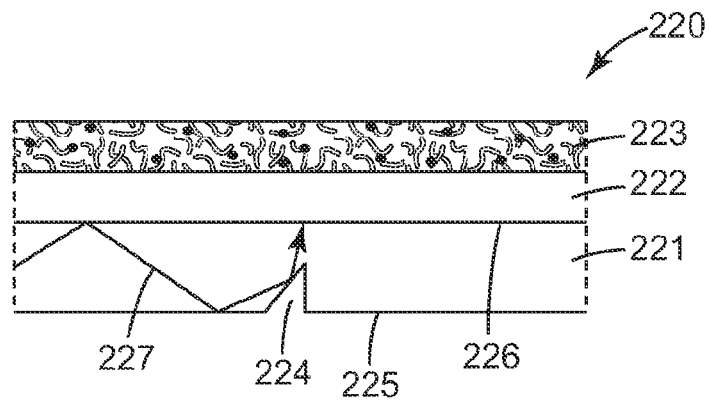

The optical article is designed and arranged to control light in a predetermined way, for example, by light being extracted from the lightguide at one or more desired locations or areas. In general, the optically smooth surface may include the surface(s) of the extracting feature(s). FIGS. 2a and 2b show examples wherein an optically smooth surface comprises the surfaces of extracting features.

FIG. 2a shows a schematic cross section of exemplary optical article 200 comprising viscoelastic layer 202 disposed on lightguide 201, and nanovoided polymeric layer 203 is disposed on viscoelastic layer 202 opposite lightguide 201. In general, the interface formed between the lightguide and the viscoelastic layer may comprise a plurality of features oriented to extract light being transported within the lightguide. A surface of the lightguide may comprise at least one feature that extends along a portion of the surface and is oriented to extract light from the lightguide. Optical article 200 comprises feature 204. In this example, the feature is a notch-like depression of interface 205. Surfaces 206 and 207 are optically smooth surfaces. The surfaces of feature 204 are optically smooth surfaces. Exemplary behavior of light within optical article 200 is shown by rays 208 and 209. Light represented by ray 208 propagates by total internal reflection within lightguide 201. Light represented by ray 209 propagates by total internal reflection within lightguide 201 and eventually strikes a surface of feature 204. As a result, the angular component of ray 209 is changed, and light represented by this ray can strike interface 205 at an angle less than the critical angle such that the light is extracted from the lightguide. Thus, as exemplified in FIG. 2a, the amount of light extracted from the lightguide may be increased. The direction in which light may be extracted from the lightguide may be varied by changing the orientation of feature 204 such that the angle at which ray 209 strikes the feature is increased or decreased but remains less than or equal to the critical angle.

FIG. 2b shows a schematic cross section of exemplary optical article 220 comprising viscoelastic layer 222 disposed on lightguide 221, and nanovoided polymeric layer 223 is disposed on viscoelastic layer 222 opposite lightguide 221. Optical article 220 comprises feature 224. In this example, the feature is a notch-like feature. Surfaces 225 and 226 are optically smooth surfaces. The surfaces of feature 224 are optically smooth surfaces. Exemplary behavior of light within lightguide 221 is shown by ray 227. Light represented by ray 227 propagates by total internal reflection within lightguide 221 and eventually strikes a surface of feature 224. As a result, the angular component of ray 227 is changed, and light represented by this ray can strike surface 226 at an angle less than the critical angle such that the light is extracted from the lightguide.

Additional exemplary optical articles comprising a viscoelastic layer disposed on a lightguide are described in Sherman et al. cited above. A nanovoided polymeric layer as described herein may be disposed on the viscoelastic layer described in Sherman et al. For example, a nanovoided polymeric layer may be disposed on the viscoelastic layers shown in any one of FIGS. 2a-2d, 3a and 3b.

The optically smooth surface may include a portion of the surface of an extracting feature. If a plurality of extracting features are used, then a combination of the above may be used, i.e., some extracting features may have completely optically smooth surfaces, some may have completely non-optically smooth surfaces, and/or some extracting features may have partially optically smooth and partially non-optically smooth surfaces. The optically smooth surface may be continuous or non-continuous over the surface of the lightguide. At least a portion of the optically smooth surface is in contact with the viscoelastic layer. Light may be diffused upon being extracted by the viscoelastic layer. Thus, light can be extracted differently depending on its properties. Light can be extracted in discrete groupings such as might be used to illuminate keys on a keypad.

Refractive index differences between the lightguide and the viscoelastic layer may be made by appropriate selection of materials. The lightguide may have a refractive index greater than that of the viscoelastic layer. The refractive index of the lightguide may be greater than about 0.002, greater than about 0.005, greater than about 0.01, greater than about 0.02, greater than about 0.03, greater than about 0.04, greater than about 0.05, greater than about 0.1, greater than about 0.2, greater than about 0.3, greater than about 0.4, or greater than about 0.5, as compared to the refractive index of the viscoelastic layer.

The lightguide may have a refractive index less than that of the viscoelastic layer. The refractive index of the lightguide may be less than about 0.002, less than about 0.005, less than about 0.01, less than about 0.02, less than about 0.03, less than about 0.04, less than about 0.05, less than about 0.1, less than about 0.2, less than about 0.3, less than about 0.4, or less than about 0.5, as compared to the refractive index of the viscoelastic layer.

The lightguide and the viscoelastic layer may have the same or nearly the same refractive index such that light can be extracted into the viscoelastic layer with little or no change to the light. The refractive index difference of the lightguide and the viscoelastic layer may be from about 0.001 to less than about 0.002.

The refractive index difference of the lightguide and viscoelastic layer may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

The amount of light extracted into the viscoelastic layer can also be controlled by varying the angular distribution of light that enters the lightguide. This may be carried out by appropriate selection of a light source(s) that is used with the optical article. Various light sources are described below. A light source that emits light having a random or a particular angular distribution may be used.

The amount and direction of light that enters the viscoelastic layer may be controlled, at the very least, by the shape, size, number, arrangement, etc. of the features, the refractive indices of the lightguide and the viscoelastic layer, the shape of the lightguide, and the angular distribution of light that is allowed to enter the lightguide.

The optical article may have any bulk three-dimensional shape as is needed for a given application. The optical article may be in the form of a square or rectangular layer, sheet, film, etc. as shown in Sherman et al. cited above, particularly FIGS. 7-11. The optical article may be cut or divided into shapes as described below. The lightguide may also be tapered such that it is thicker at one end as compared to an opposing end; tapered shapes are sometimes referred to as wedges or pseudo-wedges as described in Sherman et al.

The thickness of the lightguide is not particularly limited as long as it can function as desired. The thickness of the lightguide may be selected based on or in conjunction with the light source. For example, design parameters may limit or even require that a particular light source(s) be used, and there may be a minimum amount, or range of amounts, of light that is required to enter the lightguide. Thus, the thickness of the lightguide may be selected so that the required amount of light from a given light source can enter the lightguide. A maximum thickness of the lightguide may be required for use in illumination devices designed to be particularly thin. Exemplary thicknesses for the lightguide range from about 0.4 mil to about 1000 mil, from about 1 mil to about 300 mil, from about 1 mil to about 60 mil, or from about 0.5 mil to about 30 mil.

The thickness of the viscoelastic layer is not particularly limited as long as it can function as desired. Exemplary thicknesses for the viscoelastic layer range from about 0.4 mil to about 1000 mil, from about 1 mil to about 300 mil, from about 1 mil to about 60 mil, or from about 0.5 mil to about 30 mil.

In general, the interface formed by the viscoelastic layer and the nanovoided polymeric layer may have any three-dimensional structure depending on the desired optical effect. The interface of the viscoelastic layer and the nanovoided polymeric layer may be unstructured such that, for a given incident angle, the observed transmittance angle is within about 10° of the calculated transmittance angle. In some embodiments, there is an unstructured interface for the light emitting layer and the viscoelastic layer, and the refractive index of the light emitting layer is greater than, equal to, or less than that of the viscoelastic layer.

In some embodiments, the interface of the viscoelastic layer and the nanovoided polymeric layer may be structured. A structured interface, as used herein, means that there is at least one feature that extends along at least a portion of the interface, and this feature may be used to control the amount and/or direction of light extracted into the nanovoided polymeric layer. This can be carried out generally by varying the orientation of each feature, i.e., changing its shape, size and/or surface structure. If a plurality of features is used, then the amount and/or direction of light extracted into the nanovoided polymeric layer can be controlled not only by the orientation of each feature, but also by the number and/or arrangement of the features. General design considerations are described above for features used to extract light from the lightguide. The features of the interface formed by the viscoelastic layer and the nanovoided polymeric layer may comprise protrusions, depressions, or a combination thereof, as described above. Exemplary secondary extracting features are described in U.S. 2009/0067151 (Sahlin, et al.) incorporated herein by reference.

Figure 3A:
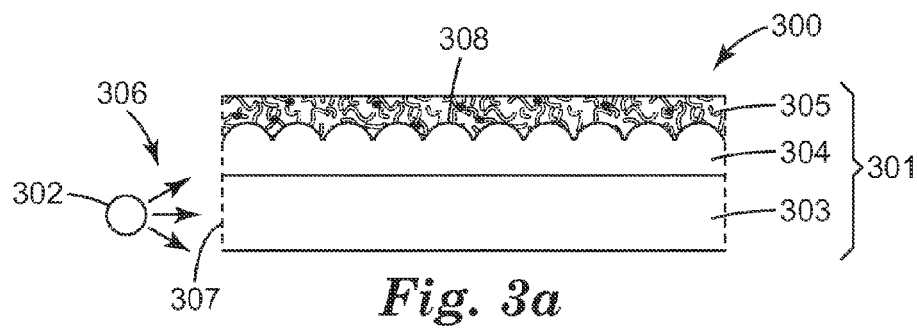
FIGS. 3a-3b and 4a-4b show embodiments of the illumination device disclosed herein.

FIG. 3a shows a schematic cross section of exemplary illumination device 300 comprising optical article 301 and light source 302. Optical article 301 comprises viscoelastic layer 304 disposed on lightguide 303, and nanovoided polymeric layer 305 disposed on viscoelastic layer 304 opposite lightguide 303. Light source 302 is positioned relative to lightguide 303 such that light emitted by the light source enters the lightguide and is transported within the lightguide by total internal reflection. Light emitted by the light source is represented by rays 306 which enter lightguide 303 through input surface 307 adapted to receive light from the light source. Interface 308 is formed between viscoelastic layer 304 and nanovoided polymeric layer 305 and comprises discreet convex lenticular features such that light is extracted into the nanovoided polymeric layer at predetermined directions.

Figure 3B:
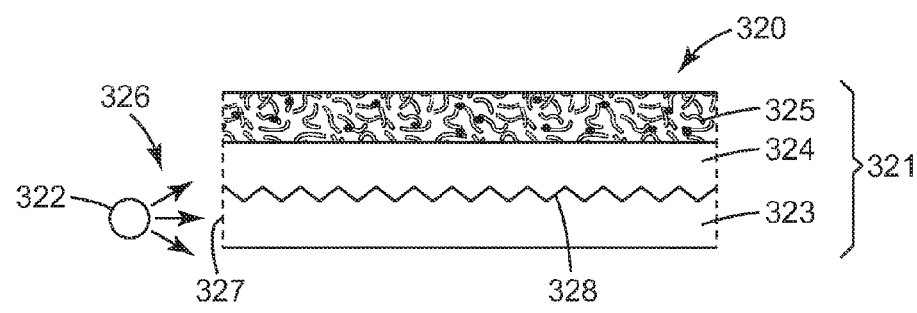

FIG. 3b shows a schematic cross section of exemplary illumination device 320 comprising optical article 321 and light source 322. Optical article 321 comprises viscoelastic layer 324 disposed on lightguide 323, and nanovoided polymeric layer 325 disposed on viscoelastic layer 324 opposite lightguide 323. Light source 322 is positioned relative to lightguide 323 such that light emitted by the light source enters the lightguide and is transported within the lightguide by total internal reflection. Light emitted by the light source is represented by rays 326 which enter lightguide 323 through input surface 327 adapted to receive light from the light source. Interface 328 is formed between viscoelastic layer 324 and nanovoided polymeric layer 325 and comprises linear prisms such that light is reflected within the viscoelastic layer.

The nanovoided polymeric layer is described in detail below. In particular, the nanovoided polymeric layer is described as having an effective index, defined as the volume weighted average of the refractive indices of the voids and the binder.

Differences between the refractive index of the viscoelastic layer and the effective index of the nanovoided polymeric layer may be made by appropriate selection of materials and characteristics of the voids. The viscoelastic layer may have a refractive index greater than the effective index of the nanovoided polymeric layer. The refractive index of the viscoelastic layer may be greater than about 0.002, greater than about 0.005, greater than about 0.01, greater than about 0.02, greater than about 0.03, greater than about 0.04, greater than about 0.05, greater than about 0.1, greater than about 0.2, greater than about 0.3, greater than about 0.4, or greater than about 0.5, as compared to the effective index of the nanovoided polymeric layer.

The viscoelastic layer may have a refractive index less than the effective index of the nanovoided polymeric layer. The refractive index of the viscoelastic layer may be less than about 0.002, less than about 0.005, less than about 0.01, less than about 0.02, less than about 0.03, less than about 0.04, less than about 0.05, less than about 0.1, less than about 0.2, less than about 0.3, less than about 0.4, or less than about 0.5, as compared to the effective index of the nanovoided polymeric layer.

The refractive index of the viscoelastic layer and the effective index of the nanovoided polymeric layer may be the same or nearly the same such that light can be extracted into the nanovoided polymeric layer with little or no change to the light. The difference between the refractive index of the viscoelastic layer and the effective index of the nanovoided polymeric layer may be from about 0.001 to less than about 0.002.

The difference between the refractive index of the viscoelastic layer and the effective index of the nanovoided polymeric layer may be from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

Figure 4A:
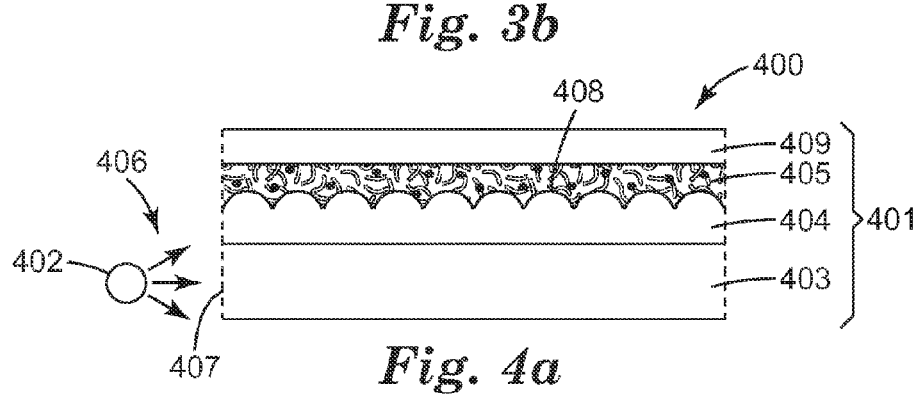

In some embodiments, the optical article further comprises an additional layer disposed on the nanovoided polymeric layer opposite the viscoelastic layer. FIG. 4a shows a schematic cross section of exemplary illumination device 400 comprising optical article 401 and light source 402. Optical article 401 comprises viscoelastic layer 404 disposed on lightguide 403, nanovoided polymeric layer 405 disposed on viscoelastic layer 404 opposite lightguide 403, and additional layer 409 disposed on nanovoided polymeric layer 405 opposite viscoelastic layer 404. Light source 402 is positioned relative to lightguide 403 such that light emitted by the light source enters the lightguide and is transported within the lightguide by total internal reflection. Light emitted by the light source is represented by rays 406 which enter lightguide 403 through input surface 407 adapted to receive light from the light source. Interface 408 is formed between viscoelastic layer 404 and nanovoided polymeric layer 405 and comprises discreet convex lenticular features such that light is extracted into the nanovoided polymeric layer at predetermined directions.

Figure 4B:
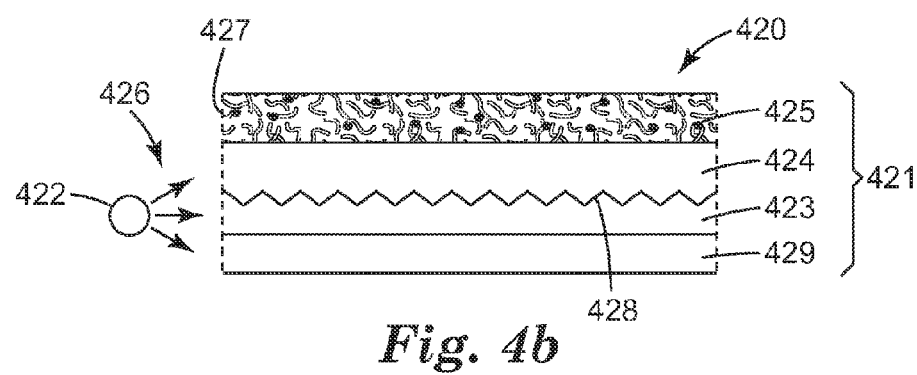

FIG. 4b shows a schematic cross section of exemplary illumination device 420 comprising optical article 421 and light source 422. Optical article 421 comprises viscoelastic layer 424 disposed on lightguide 423, nanovoided polymeric layer 425 disposed on viscoelastic layer 424 opposite lightguide 423, and additional layer 429 disposed on lightguide 423 opposite viscoelastic layer 424. Light source 422 is positioned relative to lightguide 423 such that light emitted by the light source enters the lightguide and is transported within the lightguide by total internal reflection. Light emitted by the light source is represented by rays 426 which enter lightguide 423 through input surface 427 adapted to receive light from the light source. Interface 428 is formed between lightguide 423 and viscoelastic layer 424 and comprises linear prisms such that light is reflected within the viscoelastic layer.

The additional layer may comprise a release liner, polymeric substrate, multilayer optical film, a reflector, a mirror, a polarizer, a prismatic film, a three-quarter polarizer, a retroreflective film, polymer, metal, glass, ceramic, a graphic, paper, fabric or a combination thereof. Further description including various embodiments of constructions which employ additional layers are described below.

Figure 5A:
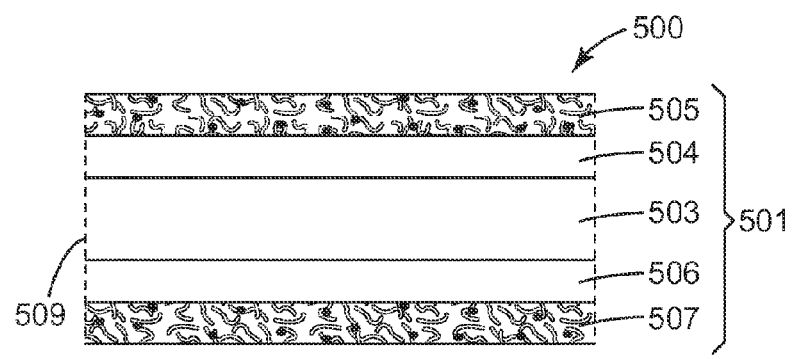
FIGS. 5a-5b and 6 show embodiments of the illumination device disclosed herein.

In some embodiments, the optical article is double-sided. FIG. 5a shows a schematic cross section of exemplary illumination device 500 comprising optical article 501 and light source 502. Optical article 501 comprises first viscoelastic layer 504 disposed on lightguide 503, and first nanovoided polymeric layer 505 disposed on first viscoelastic layer 504 opposite lightguide 503. Optical article 501 also comprises second viscoelastic layer 506 disposed on lightguide 503, and second nanovoided polymeric layer 507 disposed on second viscoelastic layer 506 opposite lightguide 503. Light source 502 is positioned relative to lightguide 503 such that light emitted by the light source enters the lightguide and is transported within the lightguide by total internal reflection. Light emitted by the light source is represented by rays 508 which enter lightguide 503 through input surface 509 adapted to receive light from the light source.

Figure 5B:
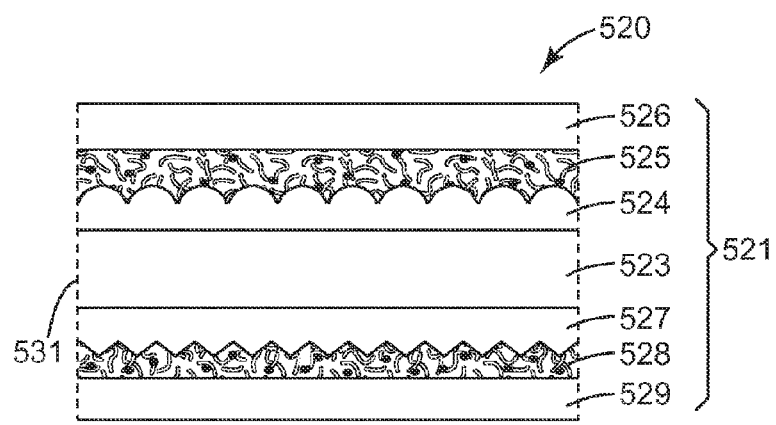

FIG. 5b shows a schematic cross section of exemplary illumination device 520 comprising optical article 521 and light source 522. Optical article 521 comprises first viscoelastic layer 524 disposed on lightguide 523, first nanovoided polymeric layer 525 disposed on first viscoelastic layer 524 opposite lightguide 523, and first additional layer 526 disposed on first nanovoided polymeric layer 525 opposite first viscoelastic layer 524. Optical article 521 also comprises second viscoelastic layer 527 disposed on lightguide 523, second nanovoided polymeric layer 528 disposed on second viscoelastic layer 527 opposite lightguide 523, and second additional layer 529 disposed on second nanovoided polymeric layer 528 opposite second viscoelastic layer 527. Light source 522 is positioned relative to lightguide 523 such that light emitted by the light source enters the lightguide and is transported within the lightguide by total internal reflection. Light emitted by the light source is represented by rays 530 which enter lightguide 523 through input surface 531 adapted to receive light from the light source.

The illumination device disclosed herein may be used as part of an LCD device for displaying stereoscopic 3D images as described, for example, in US 2008/0084518 A1 (Brott et al.). The light source comprises right and left eye image solid state light sources positioned at opposing edges of the lightguide. Each of the light sources (or sets of light sources) is optically coupled to the lightguide and both are electrically connected to a synchronization driving element as described in Brott et al. The illumination device provides right and left eye images to an LCD panel positioned above the optical article.

Figure 4C:
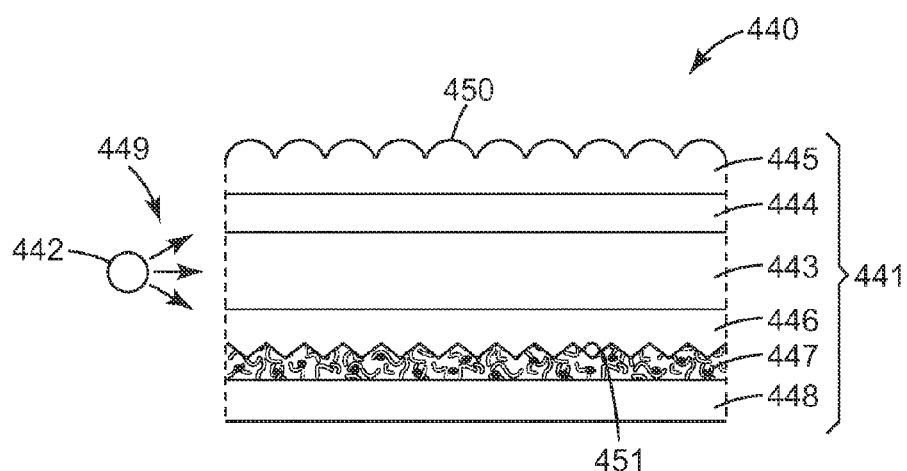
FIG. 4c shows a schematic view of an illumination device suitable for displaying stereoscopic 3D images.

The optical article disclosed herein can comprise a variety of constructions useful for displaying stereoscopic 3D images. FIG. 4c shows a schematic cross section of exemplary illumination device 440 comprising optical article 441 and light source 442. Optical article 441 comprises first and second viscoelastic layers 444 and 446, respectively, disposed on lightguide 443. Light emitting layer 445 having lenticular surface 450 is disposed on the first viscoelastic layer opposite the lightguide. Nanovoided polymeric layer 447 is disposed on the second viscoelastic layer, with prismatic structured interface 451. Additional layer 448 is disposed on the nanovoided polymeric layer opposite the second viscoelastic layer. Light source 442 is positioned relative to lightguide 443 such that light emitted by the light source enters the lightguide and is transported within the lightguide by total internal reflection. Light emitted by the light source is represented by rays 449 which enter lightguide 443 through an input surface adapted to receive light from the light source.

Optical article 441 comprises two sets of linear features: lenticular surface 450 comprises a first set of elongated lenticular features and prismatic interface 451 comprises a second set of elongated prisms. The two sets are oriented orthogonal to each other, for example, as shown in FIGS. 11a-c in WO 2010/021140 (Wolk et al.). Lenticular surface 450 emits light extracted from the lightguide, and prismatic interface 451 re-directs (e.g., reflects, extracts, etc.) light from the lightguide. Additional layer 448 is optional and can be used to provide a highly reflective surface to assist re-directing light out through the light emitting layer 445.

Figure 6:
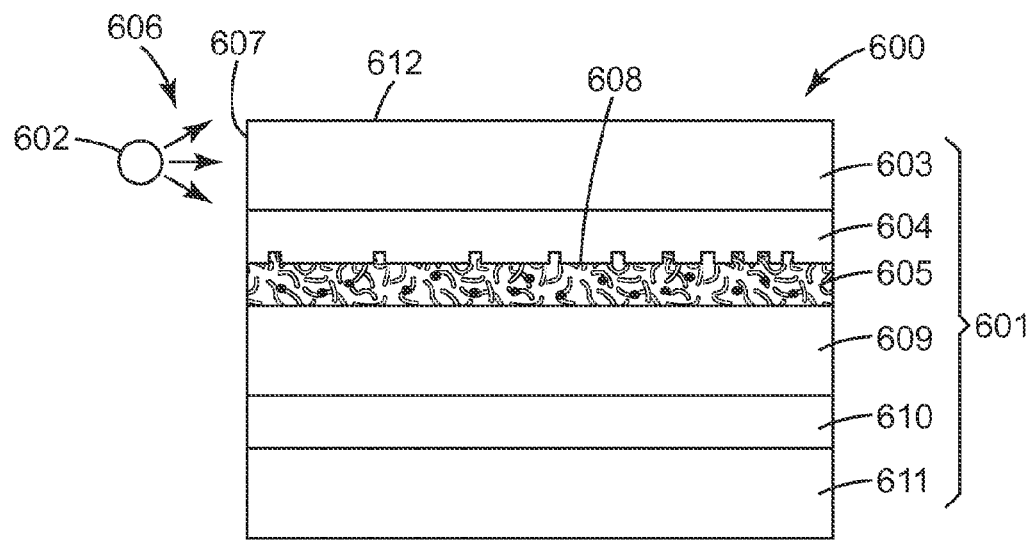

FIG. 6 shows a schematic cross section of exemplary illumination device 600 comprising optical article 601 and light source 602. Optical article 601 comprises viscoelastic layer 604 disposed on lightguide 603, nanovoided polymeric layer 605 disposed on viscoelastic layer 604 opposite lightguide 603, and additional layer 609 disposed on nanovoided polymeric layer 605 opposite viscoelastic layer 604. Light source 602 is positioned relative to lightguide 603 such that light emitted by the light source enters the lightguide and is transported within the lightguide by total internal reflection. Light emitted by the light source is represented by rays 606 which enter lightguide 603 through input surface 607 adapted to receive light from the light source. Interface 608 is formed between viscoelastic layer 604 and nanovoided polymeric layer 605 and comprises discreet extraction features such that light is extracted from the lightguide into air. The features may be spaced in a graded fashion from light source 602 so as to improve the uniformity of light extracted from the lightguide.

Various embodiments for additional layer 609 are described in detail below. In the particular embodiment shown in FIG. 6, additional layer 609 may comprise a polymeric substrate, multilayer optical film, a reflector, a mirror, a polarizer, a prismatic film, a three-quarter polarizer, a retroreflective film, polymer, metal, glass, ceramic, a graphic, paper, fabric or a combination thereof. For example, additional layer 609 may comprise a diffuse specular reflector, and/or the layer can be transparent.

Any of the optical articles described herein may comprise an adhesive layer so that the article can be adhered to a substrate for different applications as described herein. In the particular embodiment shown in FIG. 6, optical article 601 comprises adhesive layer 610 disposed on additional layer 609, and release liner 611 can be included to protect the adhesive layer from contamination and removed immediately before contact of the adhesive layer with the substrate. Suitable adhesives include any of those described herein.

In some embodiments, the optical article provides an image. In the particular embodiment shown in FIG. 6, surface 612 of the lightguide may be printed with a translucent graphic design (e.g., a CMYK halftone image), or a second additional substrate comprising a graphic may disposed on the lightguide opposite the viscoelastic layer. Additional details regarding graphics and the like are described below.

The lightguide comprises an optically transmissive material, i.e., the lightguide comprises an optically transparent material capable of transmitting light. The refractive index of the lightguide may range from about 1.3 to about 2.6, 1.4 to about 1.7, or from about 1.5 to about 1.7. The particular material used to make the lightguide depends on the required refractive index or range or refractive indices as may be influenced by other design elements of the optical article. For example, the material used to make the lightguide may need to have a refractive index greater than that of the viscoelastic layer.

The lightguide may comprise polymeric material or glass, or some combination thereof. Exemplary polymers that may be used for the lightguide include polycarbonates, poly(meth)acrylates, polystyrenes, polyurethanes, polyesters, polyimides, cyclic olefin copolymers. Particular polymers that may be used for the lightguide include polymethylmethacrylate, polyethyleneterephthalate, polyethylenenaphthalate, bisphenol A polycarbonate, polystyrene, polyvinylacetate, and derivatives thereof. The lightguide may comprise a liquid. The lightguide may be made from melt-processed or radiation-cured materials.

The lightguide may be a film as described in U.S. 2009/0067151 (Sahlin, et al.); U.S. Pat. No. 6,033,604 (Lundin et al.); U.S. 2003/0034445 A1 (Boyd et al.); WO 02/070237 A1 (Lundin); U.S. 2008/232135 A1 (Kinder et al.); U.S. Pat. No. 6,367,941 B2 (Lea et al.); U.S. Pat. No. 6,845,212 B2 (Gardiner et al.); WO 2008/022007 A1 (Vogt et al.) and U.S. Pat. No. 7,046,905 B1 (Gardiner et al.); all incorporated by reference.

The thickness of the lightguide is not particularly limited as long as it can function as desired. The thickness of the lightguide may be selected based on or in conjunction with the light source. For example, design parameters may limit or even require that a particular light source(s) be used, and there may be a minimum amount, or range of amounts, of light that is required to enter the lightguide. Thus, the thickness of the lightguide may be selected so that the required amount of light from a given light source can enter the lightguide. A maximum thickness of the lightguide may be required for use in illumination devices designed to be particularly thin. Exemplary thicknesses for the lightguide range from about 0.4 mil to about 1000 mil, from about 1 mil to about 300 mil, from about 1 mil to about 60 mil, or from about 0.5 mil to about 30 mil.

In some embodiments, the lightguide may comprise two layers wherein one of the layers comprises particles. An exemplary optical article comprises a first lightguide, a viscoelastic layer disposed on the first lightguide, a light emitting layer disposed on the viscoelastic layer opposite the first lightguide, and a second lightguide disposed on the first lightguide opposite the viscoelastic layer. The first and second lightguides may comprise the same polymer, or they may comprise different polymers wherein the refractive index difference between the polymers is from about 0.002 to about 0.5, from about 0.005 to about 0.5, from about 0.01 to about 0.5, from about 0.02 to about 0.5, from about 0.03 to about 0.5, from about 0.04 to about 0.5, from about 0.05 to about 0.5, from about 0.1 to about 0.5, from about 0.2 to about 0.5, from about 0.3 to about 0.5, or from about 0.4 to about 0.5.

The second lightguide comprises microspheres having a diameter larger than the thickness of the layer. The microspheres may be hollow and comprise glass. In some embodiments, a reflector is disposed on the second lightguide opposite the first lightguide. Useful reflectors are described below. The light emitting layer may comprise a graphic as described below. The two-layer lightguide is described by the beaded retroreflective sheeting references cited below. The construction described in this paragraph may be useful for tail lights.

In some embodiments, the lightguide comprises an input surface adapted to receive light from the light source. The input surface may have a variety of topographies depending on the optical coupling means and/or the particular light source. The input surface may have an appropriate curvature. The input edge comprising the input surface may have a particular cavity, for example a concave hemispherical cavity, to receive a convex lens of a light source. Alternately, the input surface may have refractive structures such as prisms or lenses to optically couple light from the light source into the lightguide.

In some embodiments, an extractor article disposed between the light source and the input edge may be used to facilitate optical coupling with at least some of the light emitted by the light source. Useful extractor articles may have an appropriate curvature for extracting light from the light source. A coupling material for matching refractive indices of the lightguide and some element of the light source may be used. A crosslinkable material may be used for attaching the lightguide to some part of the light source, and subsequently cured using heat and/or light to form the crosslinked material.

The coupling material may comprise silicone gel. The silicone gel may be crosslinked. The silicone gel may be mixed with a silicone oil. The silicone gel may comprise one or more silicone materials such as, for example, dimethylsilicone, diphenylsilicone, or phenylmethylsilicone. The silicone gel may comprise phenylmethylsilicone moieties that are cross-linked. The silicone gel may comprise phenylmethylsilicone moieties which are cross-linked and phenylmethylsilicone oil. The silicone gel may comprise phenylmethylsilicone moieties which are cross-linked and phenylmethylsilicone oil in a weight ratio from 0.2:1 to 5:1. The silicone gel may comprise crosslinked phenylmethylsilicone. Exemplary use of silicone gels is described in U.S. Pat. No. 7,315,418 (DiZio et al.) incorporated herein by reference.

The light source may be optically coupled to the lightguide such that at least some of the light from the light source can enter the lightguide. For example, a light source may be optically coupled to the lightguide such that greater than 1, greater than 10, greater than 20, greater than 30, greater than 40, greater than 50, greater than 90%, or about 100% of light emitted by the light source enters the lightguide. For another example, a light source may be optically coupled to the lightguide such that from about 1 to about 10%, from about 1 to about 20%, from about 1 to about 30%, from about 1 to about 40%, from about 1 to about 50%, from about 1 to about 100%, from about 1 to about 100%, from about 50 to about 100%, or from about 1 to about 100% of light emitted by the light source enters the lightguide. The light source may emit light having a random or a particular angular distribution.

The viscoelastic layer comprises one or more viscoelastic materials. In general, viscoelastic materials exhibit both elastic and viscous behavior when undergoing deformation. Elastic characteristics refer to the ability of a material to return to its original shape after a transient load is removed. One measure of elasticity for a material is referred to as the tensile set value which is a function of the elongation remaining after the material has been stretched and subsequently allowed to recover (destretch) under the same conditions by which it was stretched. If a material has a tensile set value of 0%, then it has returned to its original length upon relaxation, whereas if the tensile set value is 100%, then the material is twice its original length upon relaxation. Tensile set values may be measured using ASTM D412. Useful viscoelastic materials may have tensile set values of greater than about 10%, greater than about 30%, or greater than about 50%; or from about 5 to about 70%, from about 10 to about 70%, from about 30 to about 70%, or from about 10 to about 60%.

Viscous materials that are Newtonian liquids have viscous characteristics that obey Newton's law which states that stress increases linearly with shear gradient. A liquid does not recover its shape as the shear gradient is removed. Viscous characteristics of useful viscoelastic materials include flowability of the material under reasonable temperatures such that the material does not decompose.

The viscoelastic layer may have properties that facilitate sufficient contact or wetting with at least a portion of a substrate such that the viscoelastic layer and the substrate are optically coupled. Light can then be extracted out of the viscoelastic layer and into the substrate. The viscoelastic layer is generally soft, compliant and flexible. Thus, the viscoelastic layer may have an elastic modulus (or storage modulus G') such that sufficient contact can be obtained, and a viscous modulus (or loss modulus G") such that the layer doesn't flow undesirably, and a damping coefficient (G"/G', tan D) for the relative degree of damping of the layer.

Useful viscoelastic materials may have a storage modulus, G', of less than about 300,000 Pa, measured at 10 rad/sec and a temperature of from about 20 to about 22° C. Useful viscoelastic materials may have a storage modulus, G', of from about 30 to about 300,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C. Useful viscoelastic materials may have a storage modulus, G', of from about 30 to about 30,000 Pa, measured at 10 rad/sec and a temperature of from about 20 to about 22° C. Useful viscoelastic materials may have a storage modulus, G', of from about 30 to about 150,000 Pa, measured at 10 rad/sec and a temperature of from about 20 to about 22° C., and a loss tangent (tan d) of from about 0.4 to about 3. Viscoelastic properties of materials can be measured using Dynamic Mechanical Analysis according to, for example, ASTM D4065, D4440, and D5279.

In some embodiments, the viscoelastic layer comprises a PSA layer as described in the Dalquist criterion line (as described in Handbook of Pressure Sensitive Adhesive Technology, Second Ed., D. Satas, ed., Van Nostrand Reinhold, New York, 1989.)

The viscoelastic layer may have a particular peel force or at least exhibit a peel force within a particular range. For example, the viscoelastic layer may have a 90° peel force of from about 50 to about 3000 g/in, from about 300 to about 3000 g/in, or from about 500 to about 3000 g/in. Peel force may be measured using a peel tester from IMASS. The 90° peel adhesion between the viscoelastic layer and the lightguide may be from about 190 N/m (500 g/in) to about 1160 N/m (3000 g/in).

In some embodiments, the viscoelastic layer comprises an optically clear layer having high light transmittance of from about 80 to about 100%, from about 90 to about 100%, from about 95 to about 100%, or from about 98 to about 100% over at least a portion of the visible light spectrum (about 400 to about 700 nm). In some embodiments, the viscoelastic layer has a haze value of less than about 5%, less than about 3%, or less than about 1%. In some embodiments, the viscoelastic layer has a haze value of from about 0.01 to less than about 5%, from about 0.01 to less than about 3%, or from about 0.01 to less than about 1%. Haze values in transmission can be determined using a haze meter according to ASTM D1003.

In some embodiments, the viscoelastic layer comprises an optically clear layer having high light transmittance and a low haze value. High light transmittance may be from about 90 to about 100%, from about 95 to about 100%, or from about 99 to about 100% over at least a portion of the visible light spectrum (about 400 to about 700 nm), and haze values may be from about 0.01 to less than about 5%, from about 0.01 to less than about 3%, or from about 0.01 to less than about 1%. The viscoelastic layer may also have a light transmittance of from about 50 to about 100%.

In some embodiments, the viscoelastic layer is hazy and diffuses light, particularly visible light. A hazy viscoelastic layer may have a haze value of greater than about 5%, greater than about 20%, or greater than about 50%. A hazy viscoelastic layer may have a haze value of from about 5 to about 90%, from about 5 to about 50%, or from about 20 to about 50%. In some embodiments, the viscoelastic layer may be translucent in that it reflects and transmits light.

The viscoelastic layer may have a refractive index in the range of from about 1.3 to about 2.6, 1.4 to about 1.7, or from about 1.5 to about 1.7. The particular refractive index or range of refractive indices selected for the viscoelastic layer may depend on the overall design of the illumination device, e.g., the presence or absence of substrates in contact with the layer and the particular application in which the device may be used.

The viscoelastic layer generally comprises at least one polymer. The polymer may comprise a (meth)acrylate, rubber, silicone, urethane, or a combination thereof. The viscoelastic layer may comprise at least one PSA. PSAs are useful for adhering together adherends and exhibit properties such as: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process. A quantitative description of PSAs can be found in the Dahlquist reference cited above.

Useful PSAs include those based on natural rubbers, synthetic rubbers, styrene block copolymers, (meth)acrylic block copolymers, polyvinyl ethers, polyolefins, and poly(meth) acrylates. As used herein, (meth)acrylic refers to both acrylic and methacrylic species and likewise for (meth)acrylate.

Useful PSAs include (meth)acrylates, rubbers, thermoplastic elastomers, silicones, urethanes, and combinations thereof. In some embodiments, the PSA is based on a (meth) acrylic PSA or at least one poly(meth)acrylate. Herein, (meth)acrylate refers to both acrylate and methacrylate groups. Particularly preferred poly(meth)acrylates are derived from: (A) at least one monoethylenically unsaturated alkyl (meth)acrylate monomer; and (B) at least one monoethylenically unsaturated free-radically copolymerizable reinforcing monomer. The reinforcing monomer has a homopolymer glass transition temperature (Tg) higher than that of the alkyl (meth)acrylate monomer and is one that increases the Tg and cohesive strength of the resultant copolymer. Herein, "copolymer" refers to polymers containing two or more different monomers, including terpolymers, tetrapolymers, etc.

Monomer A, which is a monoethylenically unsaturated alkyl (meth)acrylate, contributes to the flexibility and tack of the copolymer. Preferably, monomer A has a homopolymer Tg of no greater than about 0° C. Preferably, the alkyl group of the (meth)acrylate has an average of about 4 to about 20 carbon atoms, and more preferably, an average of about 4 to about 14 carbon atoms. The alkyl group can optionally contain oxygen atoms in the chain thereby forming ethers or alkoxy ethers, for example. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Benzyl acrylate may also be used. Other examples include, but are not limited to, poly-ethoxylated or -propoxylated methoxy (meth)acrylates such as acrylates of CARBOWAX (commercially available from Union Carbide) and NK ester AM90G (commercially available from Shin Nakamura Chemical, Ltd., Japan). Preferred monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Monomer B, which is a monoethylenically unsaturated free-radically copolymerizable reinforcing monomer, increases the Tg and cohesive strength of the copolymer. Preferably, monomer B has a homopolymer Tg of at least about 10° C., for example, from about 10 to about 50° C. More preferably, monomer B is a reinforcing (meth)acrylic monomer, including an acrylic acid, a methacrylic acid, an acrylamide, or a (meth)acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Preferred reinforcing acrylic monomers that can be used as monomer B include acrylic acid and acrylamide. Combinations of various reinforcing monoethylenically unsaturated monomers categorized as a B monomer can be used to make the copolymer.

In some embodiments, the (meth)acrylate copolymer is formulated to have a resultant Tg of less than about 0° C. and more preferably, less than about −10° C. Such (meth)acrylate copolymers preferably include about 60 to about 98% by weight of at least one monomer A and about 2 to about 40% by weight of at least one monomer B, both relative to the total weight of the (meth)acrylate copolymer. Preferably, the (meth)acrylate copolymer has about 85 to about 98% by weight of at least one monomer A and about 2 to about 15% by weight of at least one monomer B, both relative to the total weight of the (meth)acrylate copolymer.

In some embodiments, the viscoelastic layer comprises a (meth)acrylic pressure sensitive adhesive, the (meth)acrylic pressure sensitive adhesive comprising a first monomer comprising a monoethylenically unsaturated alkyl (meth)acrylate monomer, and a second monomer wherein a homopolymer of the second monomer has a Tg of at least about 10° C.

Useful rubber-based PSAs are generally of two classes, natural rubber-based or synthetic rubber-based. Useful natural rubber-based PSAs generally contain masticated natural rubber, for example, from about 20 to about 75% by weight of one or more tackifying resins, from about 25 to about 80% by weight of natural rubber, and typically from about 0.5 to about 2.0% by weight of one or more antioxidants, all relative to the total weight of the masticated rubber. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include but are not limited to wood rosin and its hydrogenated derivatives; terpene resins of various softening points, and petroleum-based resins, such as, the ESCOREZ 1300 series of C5 aliphatic olefin-derived resins from Exxon.

Antioxidants may be used with natural rubbers in order to retard oxidative attack on the rubber which can result in loss of cohesive strength of the adhesive. Useful antioxidants include but are not limited to amines, such as N—N' di-beta-naphthyl-1,4-phenylenediamine, available as AGERITE Resin D from R.T. Vanderbilt Co., Inc.; phenolics, such as 2,5-di-(t-amyl)hydroquinone, available as SANTOVAR A, available from Monsanto Chemical Co.; tetrakis[methylene 3-(3',5'-di-tert-butyl-4'-hydroxyphenyl)propianate]methane, available as IRGANOX 1010 from Ciba-Geigy Corp.; 2,2'-methylenebis(4-methyl-6-tert butyl phenol), known as Antioxidant 2246; and dithiocarbamates, such as zinc dithiodibutyl carbamate. Curing agents may be used to at least partially vulcanize (crosslink) the PSA.

Useful synthetic rubber-based PSAs include adhesives that are generally rubbery elastomers, which are either self-tacky or non-tacky and require tackifiers. Self-tacky synthetic rubber PSAs include, for example, butyl rubber, a copolymer of isobutylene with less than 3 percent isoprene, polyisobutylene, a homopolymer of isoprene, polybutadiene, or styrene/butadiene rubber. Butyl rubber PSAs often contain an antioxidant such as zinc dibutyl dithiocarbamate. Polyisobutylene PSAs do not usually contain antioxidants. Synthetic rubber PSAs, which generally require tackifiers, are also generally easier to melt process as compared to natural rubber PSAs which typically having very high molecular weights. They comprise polybutadiene or styrene/butadiene rubber, from 10 parts to 200 parts of a tackifier, and generally from 0.5 to 2.0 parts per 100 parts rubber of an antioxidant such as IRGANOX 1010. An example of a synthetic rubber is AMERIPOL 101 1A, a styrene/butadiene rubber available from BF Goodrich.

Tackifiers that may be used with synthetic rubber PSAs include derivatives of rosins such as FORAL 85, a stabilized rosin ester from Hercules, Inc.; the SNOWTACK series of gum rosins from Tenneco; the AQUATAC series of tall oil rosins from Sylvachem; synthetic hydrocarbon resins such as the PICCOLYTE A series, polyterpenes from Hercules, Inc.; the ESCOREZ 1300 series of C5 aliphatic olefin-derived resins; and the ESCOREZ 2000 Series of C9 aromatic/aliphatic olefin-derived resins. Curing agents may be added to at least partially vulcanize (crosslink) the PSA.

Useful thermoplastic elastomer PSAs include styrene block copolymer PSAs which generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer PSAs include linear, radial, star and tapered styrene-isoprene block copolymers such as KRATON D1107P, available from Shell Chemical Co., and EUROPRENE SOL TE 9110, available from EniChem Elastomers Americas, Inc.; linear styrene-(ethylene-butylene) block copolymers such as KRATON G1657, available from Shell Chemical Co.; linear styrene-(ethylene-propylene) block copolymers such as KRATON G1750X, available from Shell Chemical Co.; and linear, radial, and star styrene-butadiene block copolymers such as KRATON D1118X, available from Shell Chemical Co., and EUROPRENE SOL TE 6205, available from EniChem Elastomers Americas, Inc. The polystyrene blocks tend to form domains in the shape of spheroids, cylinders, or plates that causes the block copolymer PSAs to have two phase structures.

Resins that associate with the rubber phase may be used with thermoplastic elastomer PSAs if the elastomer itself is not tacky enough. Examples of rubber phase associating resins include aliphatic olefin-derived resins, such as the ESCOREZ 1300 series and the WINGTACK series, available from Goodyear; rosin esters, such as the FORAL series and the STAYBELITE Ester 10, both available from Hercules, Inc.; hydrogenated hydrocarbons, such as the ESCOREZ 5000 series, available from Exxon; polyterpenes, such as the PICCOLYTE A series; and terpene phenolic resins derived from petroleum or terpentine sources, such as PICCOFYN A100, available from Hercules, Inc.

Resins that associate with the thermoplastic phase may be used with thermoplastic elastomer PSAs if the elastomer is not stiff enough. Thermoplastic phase associating resins include polyaromatics, such as the PICCO 6000 series of aromatic hydrocarbon resins, available from Hercules, Inc.; coumarone-indene resins, such as the CUMAR series, available from Neville; and other high-solubility parameter resins derived from coal tar or petroleum and having softening points above about 85° C., such as the AMOCO 18 series of alphamethyl styrene resins, available from Amoco, PICCOVAR 130 alkyl aromatic polyindene resin, available from Hercules, Inc., and the PICCOTEX series of alphamethyl styrene/vinyl toluene resins, available from Hercules.

Useful silicone PSAs include polydiorganosiloxanes and polydiorganosiloxane polyoxamides. Useful silicone PSAs include silicone-containing resins formed from a hyrosilylation reaction between one or more components having silicon-bonded hydrogen and aliphatic unsaturation. Examples of silicon-bonded hydrogen components include high molecular weight polydimethylsiloxane or polydimethyldiphenylsiloxane, and that contain residual silanol functionality (SiOH) on the ends of the polymer chain. Examples of aliphatic unsaturation components include siloxanes functionalized with two or more (meth)acrylate groups or block copolymers comprising polydiorganosiloxane soft segments and urea terminated hard segments. Hydrosilylation may be carried out using platinum catalysts.

Useful silicone PSAs may comprise a polymer or gum and an optional tackifying resin. The tackifying resin is generally a three-dimensional silicate structure that is endcapped with trimethylsiloxy groups (OSiMe$_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif.

Manufacture of typical silicone PSAs is described in U.S. Pat. No. 2,736,721 (Dexter). Manufacture of silicone urea block copolymer PSAs is described in U.S. Pat. No. 5,214,119 (Leir, et al).

Useful silicone PSAs may also comprise a polydiorganosiloxane polyoxamide and an optional tackifier as described in U.S. Pat. No. 7,361,474 (Sherman et al.) incorporated herein by reference. For example, the polydiorganosiloxane polyoxamide may comprise at least two repeat units of Formula I:

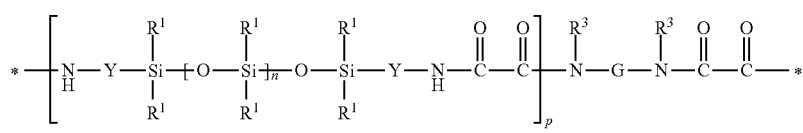

wherein: each $R^1$ is independently an alkyl, haloalkyl, aralkyl, alkenyl, aryl, or aryl substituted with an alkyl, alkoxy, or halo, wherein at least 50 percent of the $R^1$ groups are methyl; each Y is independently an alkylene, aralkylene, or a combination thereof; G is a divalent residue equal to a diamine of formula $R^3$HN-G-NHR$^3$ minus the two —NHR$^3$ groups; $R^3$ is hydrogen or alkyl or $R^3$ taken together with G and with the nitrogen to which they are both attached forms a heterocyclic group; n is independently an integer of 40 to 1500; and p is an integer of 1 to 10; and an asterisk (*) indicates a site of attachment of the repeat unit to another group in the copolymer. The copolymer may have a first repeat unit where p is equal to 1 and a second repeat unit where p is at least 2. G may comprise an alkylene, heteroalkylene, arylene, aralkylene, polydiorganosiloxane, or a combination thereof. The integer n may be an integer of 40 to 500. These polydiorganosiloxane polyoxamides can be used in combination with a tackifier. Useful tackifiers include silicone tackifying resins as described in U.S. Pat. No. 7,090,922 B2 (Zhou et al.) incorporated herein by reference. Some of these silicone-containing PSAs may be heat activated.

The PSA may be crosslinked to the extent that the crosslinks do not interfere with desired properties of the viscoelastic layer. Generally, the PSA may be crosslinked to the extent that the crosslinks do not interfere with the viscous characteristics of the viscoelastic layer. Crosslinking is used to build molecular weight and strength of the PSA. The degree of crosslinking may be selected based upon the application for which the layer is intended. Crosslinking agents may be used to form chemical crosslinks, physical crosslinks or a combination thereof. Chemical crosslinks include covalent bonds and ionic bonds. Covalent crosslinks may be formed by incorporating a multi-functional monomer in the polymerization process, followed by curing using, e.g., ultraviolet radiation, heat, ionizing radiation, moisture, or a combination thereof.

Physical crosslinks include noncovalent bonds and are generally thermally reversible. Examples of physical crosslinks include high Tg (i.e., those having a Tg higher than room temperature, preferably higher than 70° C.) polymer segments included, for example, in thermoplastic elastomer block copolymers. Such segments aggregate to form physical crosslinks that dissipate upon heating. If a physically crosslinked PSA is used such as a thermoplastic elastomer, the embossing typically is carried out at temperature below, or even substantially below, the temperature at which the adhesive flows. Hard segments include the styrene macromers of U.S. Pat. No. 4,554,324 (Husman et al.) incorporated herein by reference and/or acid/base interactions (i.e., those involving functional groups within the same polymer or between polymers or between a polymer and an additive) such as polymeric ionic crosslinking as described in WO 99/42536 (Stark et al.).

Suitable crosslinking agents are also disclosed in U.S. Pat. No. 4,737,559 (Kellen), U.S. Pat. No. 5,506,279 (Babu et al.), and U.S. Pat. No. 6,083,856 (Joseph et al.). The crosslinking agent can be a photocrosslinking agent, which, upon exposure to ultraviolet radiation (e.g., radiation having a wavelength of from about 250 to about 400 nm), causes the copolymer to crosslink. The crosslinking agent is used in an effective amount, by which is meant an amount that is sufficient to cause crosslinking of the PSA to provide adequate cohesive strength to produce the desired final adhesion properties. Preferably, the crosslinking agent is used in an amount of about 0.1 part to about 10 parts by weight, based on the total weight of monomers.

In some embodiments, the viscoelastic layer comprises a PSA formed from a (meth)acrylate block copolymer as described in U.S. Pat. No. 7,255,920 B2 (Everaerts et al.). In general, these (meth)acrylate block copolymers comprise: at least two A block polymeric units that are the reaction product of a first monomer composition comprising an alkyl methacrylate, an aralkyl methacrylate, an aryl methacrylate, or a combination thereof, each A block having a Tg of at least 50° C., the methacrylate block copolymer comprising from 20 to 50 weight percent A block; and at least one B block polymeric unit that is the reaction product of a second monomer composition comprising an alkyl (meth)acrylate, a heteroalkyl (meth)acrylate, a vinyl ester, or a combination thereof, the B block having a Tg no greater than 20° C., the (meth)acrylate block copolymer comprising from 50 to 80 weight percent B block; wherein the A block polymeric units are present as nanodomains having an average size less than about 150 nm in a matrix of the B block polymeric units.

In some embodiments, the viscoelastic layer comprises a clear acrylic PSA, for example, those available as transfer tapes such as VHB™ Acrylic Tape 4910F from 3M Company and 3M™ Optically Clear Laminating Adhesives (8140 and 8180 series).

In some embodiments, the viscoelastic layer comprises a PSA formed from at least one monomer containing a substituted or an unsubstituted aromatic moiety as described in U.S. Pat. No. 6,663,978 B1 (Olson et al.):

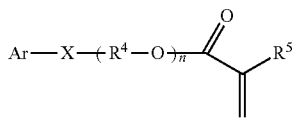

wherein Ar is an aromatic group which is unsubstituted or substituted with a substituent selected from the group consisting of $Br_y$ and $R^6_z$ wherein y represents the number of bromine substituents attached to the aromatic group and is an integer of from 0 to 3, $R^6$ is a straight or branched alkyl of from 2 to 12 carbons, and z represents the number of $R^6$ substituents attached to the aromatic ring and is either 0 or 1 provided that both y and z are not zero; X is either O or S; n is from 0 to 3; $R^4$ is an unsubstituted straight or branched alkyl linking group of from 2 to 12 carbons; and $R^5$ is either H or $CH_3$.

In some embodiments, the viscoelastic layer comprises a copolymer as described in U.S. Ser. No. 11/875,194 (Determan et al.), comprising (a) monomer units having pendant bephenyl groups and (b) alkyl (meth)acrylate monomer units.

In some embodiments, the viscoelastic layer comprises a copolymer as described in WO 2009/058513 (Determan et al.), comprising (a) monomer units having pendant carbazole groups and (b) alkyl (meth)acrylate monomer units.

In some embodiments, the viscoelastic layer comprises an adhesive as described in WO 2009/061673 (Schaffer et al.), comprising a block copolymer dispersed in an adhesive matrix to form a Lewis acid-base pair. The block copolymer comprises an AB block copolymer, and the A block phase separates to form microdomains within the B block/adhesive matrix. For example, the adhesive matrix may comprise a copolymer of an alkyl (meth)acrylate and a (meth)acrylate having pendant acid functionality, and the block copolymer may comprise a styrene-acrylate copolymer. The microdomains may be large enough to forward scatter incident light, but not so large that they backscatter incident light. Typically these microdomains are larger than the wavelength of visible light (about 400 to about 700 nm). In some embodiments the microdomain size is from about 1.0 to about 10 um.

The viscoelastic layer may comprise a stretch releasable PSA. Stretch releasable PSAs are PSAs that can be removed from a substrate if they are stretched at or nearly at a zero degree angle. In some embodiments, the viscoelastic layer or a stretch release PSA used in the viscoelastic layer has a shear storage modulus of less than about 10 MPa when measured at 1 rad/sec and −17° C., or from about 0.03 to about 10 MPa when measured at 1 rad/sec and −17° C. Stretch releasable PSAs may be used if disassembling, reworking, or recycling is desired.

In some embodiments, the stretch releasable PSA may comprise a silicone-based PSA as described in U.S. Pat. No. 6,569,521 B1 (Sheridan et al.) or WO 2009/89137 (Sherman et al.) and WO 2009/114683 (Determan et al.). Such silicone-based PSAs include compositions of an MQ tackifying resin and a silicone polymer. For example, the stretch releasable PSA may comprise an MQ tackifying resin and an elastomeric silicone polymer selected from the group consisting of urea-based silicone copolymers, oxamide-based silicone copolymers, amide-based silicone copolymers, urethane-based silicone copolymers, and mixtures thereof. If a stretchable PSA is used, then the layer can be selectively stretched so that light is then extracted.

In some embodiments, the viscoelastic layer comprises a soft, conformable, self wetting adhesive which is optically clear and exhibits spontaneous wet out to surfaces. Useful self wetting adhesives are pressure sensitive adhesives which are designed to build adhesion slowly over time, allowing repositioning of the adhesive on the substrate, to some maximum adhesion such that the adhesive is cleanly removable from the substrate. Self wetting adhesives exhibit 90° peel adhesion of no greater than 2.9 Newtons/decimeter (75 grams per inch) after one minute, measured at a rate of 2.3 meters/minute (90 inches/minute) over a five second data collection time. Upon aging for one week at room temperature, 90° peel adhesion is no more than 15.4 (400 grams per inch).

Exemplary self wetting adhesives include polymers formed from: an X-B-X reactive oligomer, wherein X comprises an ethylenically unsaturated group, and B comprises a non-silicone urea-based unit, as described in U.S. application Ser. No. 12/810,168 (Sherman et al.); an X-A-B-A-X reactive oligomer, wherein X comprises an ethylenically unsaturated group, B comprises a non-silicone unit with a number average molecular weight of 5,000 grams/mole or greater, and A comprises a urethane linking group, as described in PCT Appl. No. US2010/031689 (Sherman et al.); a majority of a silicone-modified pressure sensitive adhesive component comprising: a copolymer comprising the reaction product of an acidic or basic monomer, a (meth)acrylic or vinyl monomer, and a silicone macromer, in combination with a high Tg polymer comprising an acid or base functionality, wherein the functionality of the silicone-modified pressure sensitive adhesive component and the functionality of the high Tg polymer form an acid-base interaction when mixed, as described in U.S. application Ser. No. 12/867,833 (Sherman et al.); an X-B-X reactive oligomer, wherein X comprises an ethylenically unsaturated group, and B comprises a non-siloxane containing segmented urea-based unit, or a non-siloxane containing urethane-based unit as described in U.S. Provisional Appl. Ser. No. 61/377,212 (Sherman et al.); and a free radically polymerizable urethane- or urea-based oligomer and a free radically polymerizable segmented siloxane-based copolymer U.S. Provisional Appl. Ser. No. 61/410,510 (Tapio et al.).

The viscoelastic layer may comprise an aerogel. An aerogel is a low-density solid state material derived from gel in which the liquid component of the gel has been replaced with air. Silica, alumina and carbon aerogels are exemplary aerogels that may be used.

The viscoelastic layer can optionally include one or more additives such as filler, particles, plasticizers, chain transfer agents, initiators, antioxidants, stabilizers, fire retardants, viscosity modifying agents, foaming agents, antistats, colorants such as dyes and pigments, fluorescent dyes and pigments, phosphorescent dyes and pigments, fibrous reinforcing agents, and woven and non-woven fabrics.

The viscoelastic layer may be made hazy and/or diffusive by including particles such as nanoparticles (diameter less than about 1 um), microspheres (diameter 1 um or greater), or fibers. Exemplary nanoparticles include $TiO_2$. Haze and diffusive properties can also be incorporated into the viscoelastic layer by incorporating bubbles into the layer. The bubbles may have a diameter of from about 0.01 to about 1 um.

Bubbles may be introduced by adding, e.g., foaming agents. Examples of additional additives that may be added to the viscoelastic layer include glass beads, reflective particles, and conductive particles. In some embodiments, the viscoelastic layer may comprise a PSA matrix and particles as described in WO 2010/033571 (Sherman et al.), comprising an optically clear PSA and silicon resin particles having a refractive index less than that of the PSA, and incorporated herein by reference. In some embodiments, the presence of particles, bubbles, air, etc. increases the scatter and uniformity of light.

The thickness of the viscoelastic layer is not particularly limited as long as the optical article can function as desired. The thickness of the viscoelastic layer may be selected based on or in conjunction with the layer, the light emitting layer, and/or the light source. The thickness of the viscoelastic layer may be limited by the overall thickness of the article in which the optical article is used. The thickness of the viscoelastic layer may range from about 0.4 mil to about 1000 mil, from about 1 mil to about 300 mil, or from about 1 mil to about 60 mil.

The nanovoided polymeric layer is described in the Wolk et al. references cited above, as well as the following references for which the disclosures are incorporated by reference herein: WO 2010/0120468 (Kolb et al.) and WO 2010/120864 (Hao et al.). In general, the nanovoided polymeric layer comprises a low refractive index layer that can be used in place of air when disposed between two substrates. The nanovoided polymeric layer comprises a polymeric solid network or matrix that at least partially surrounds nanopores or nanovoids. The nanovoided polymeric layer can also be described as having a plurality of interconnected nanovoids or a network of nanovoids dispersed in a binder. The nanovoided polymeric layer can be porous having nanovoids at the surface and within the layer. At least some of the nanovoids in the plurality or network are connected to one another via hollow tunnels or hollow tunnel-like passages.

The nanovoided polymeric layer can comprise multiple pluralities of interconnected nanovoids or multiple networks of nanovoids where the nanovoids in each plurality or network are interconnected. In some cases, in addition to multiple pluralities of interconnected nanovoids, the nanovoided polymeric layer can include a plurality of closed or unconnected nanovoids meaning that the nanovoids are not connected to other nanovoids via tunnels.

In general, the nanovoids can have any suitable diameter or be in a range of diameter. For example, in some cases, at least a majority of the nanovoids, such as at least 60% or 70% or 80% or 90% or 95% of the nanovoids, have a size that is in a desired range. For example, in some cases, at least a majority of the nanovoids, such as at least 60% or 70% or 80% or 90% or 95% of the nanovoids, have a size less than about any one of the following in um: 10, 7, 5, 4, 3, 2, 1, 0.7 and 0.5. The size and distribution of diameters can be controlled by choosing suitable composition and fabrication, such as coating, drying and curing conditions as described in U.S. Provisional Appl. No. 61/294,610 (Wolk et al.) and references cited therein.

In some cases, some of the nanovoids can be sufficiently small so that their primary optical effect is to reduce the effective index of refraction, and/or sufficiently large so that the nanovoided polymeric layer scatters light. When the nanovoided polymeric layer is sufficiently thick, and the nanovoids are sufficiently small, the layer can have an effective permittivity, $\epsilon_{\it{eff}}$, as defined by Equation 1, and an effective index, $n_{\it{eff1}}$, as defined by Equation 2. In some cases, such as when the difference between the refractive indices of the nanovoids and the binder is sufficiently small, the nanovoided polymeric layer can have an effective index, $n_{\it{eff2}}$, as defined by Equation 3.

$$\epsilon_{\it{eff}} = f\epsilon_v + (1-f)\epsilon_b \quad (1)$$

$$n_{\it{eff1}}^2 = fn_v^2 + (1-f)n_b^2 \quad (2)$$

$$n_{\it{eff2}} = fn_v + (1-f)n_b \quad (3)$$

For a nanovoided polymeric layer having an effective index as defined by Equation 3, the effective index of the nanovoided microstructured layer is the volume weighted average of the indices of refraction of the nanovoids and the binder. For example, a nanovoided polymeric layer having a nanovoid volume fraction of about 50% and comprising a binder having an index of refraction of about 1.5 can have an effective index of refraction of about 1.25. In some embodiments, the nanovoided polymeric layer has an effective index of refraction from about 1.15 to about 1.45, or from about 1.2 to 1.4.

In general, the nanovoided polymeric layer can have any porosity or void volume fraction depending on the intended use of the illumination device. In some cases, the volume fraction of plurality of voids in the layer is not less than about 10%, or not less than about 20%, or not less than about 30%, or not less than about 40%, or not less than about 50%, or not less than about 60%, or not less than about 70%, or not less than about 80%, or not less than about 90%.

In some embodiments, the nanovoided polymeric layer is sufficiently thick so that the layer can have an effective index of refraction that can be expressed in terms of the indices of refraction of the nanovoids and the binder, and the nanovoid or pore volume fraction or porosity. In such cases, the thickness of the nanovoided polymeric layer is from about 1 to about 500 um, or from about 1 to about 1000 um.

The binder or polymeric material used in the nanovoided layer is not particularly limited and is typically formed from monomers during formation of the layer. That is, the binder is made from a polymerizable coating material (as described below). The binder can be made from monomers polymerized by conventional means such as those that are chemically and/or thermally initiated, as well as initiated by visible, UV and e-beam radiation. Exemplary polymerizable materials include low molecular weight materials (less than 500 g/mol), oligomers (500 to 10,000 g/mol) and polymers (greater than 10,000 g/mol).

Exemplary polymerizable materials are described in detail in Wolk et al. Polymerizable materials include those having ethylenically unsaturated compounds such as styrenes and (meth)acrylates (acrylates and methacrylates), and other materials such as epoxy-functionalized materials, isocyanates, and silicone- and fluoro-containing materials. Combinations of polymerizable materials may be used, and cross linking agents may be employed such that the resulting binder in the nanovoided polymeric layer is crosslinked.

The nanovoids can be free of all matter and/or particulates. In some embodiments, nanovoids may include one or more small fiber- or string-like objects such as binder and/or nanoparticles. In general, suitable nanoparticles can have any diameter or be in a range of diameters, but particularly from about 3 to about 1000 nm, from about 3 to about 500 nm, from about 3 to about 100 nm, or from about 3 to about 50 nm. In some embodiments, at least a majority of the nanoparticles, such as at least 60% or 70% or 80% or 90% or 95% of the nanoparticles, have a size that is in a desired range. In some embodiments, particles can be aggregates of nanoparticles that have a large aspect ratio. The maximum cross-sectional dimension of the aggregates can be within any of the aforementioned ranges. Exemplary nanoparticles in the form of aggregates include "fumed" nanoparticles, such as fumed silica and fumed alumina, with diameter less than about 50 nm, for example, CAB-O-SPERSE products available from Cabot Co.

In some cases, the nanoparticles can be sufficiently small so that their primary optical effect is to alter the index of refraction, and/or sufficiently large so that the layer scatters light. For example, incorporation of high refractive index nanoparticles such as zirconia (n=2.2) and titania (n=2.7) can be incorporated into the nanovoided polymeric layer such that the index of refraction is increased from about 1.4 to about 2.0.

The nanoparticles can be inorganic nanoparticles, organic (e.g., polymeric) nanoparticles, or a combination of inorganic and organic nanoparticles. In one particular embodiment, nanoparticles can be porous particles, hollow particles, solid particles, or a combination thereof. Examples of suitable inorganic nanoparticles include silica and metal oxides such as zirconia, titania, ceria, alumina, iron oxide, vanadia, antimony oxide, tin oxide, alumina/silica, silica/zirconia and combinations thereof. The nanoparticles can be provided in the form of a colloidal dispersion. Metal oxides can be found under the product designation NALCO from Nalco Chemical Co.; IPA and MA sols from Nissan Chemical America Co.; and SNOWTEX, also from Nissan Chemical America Co.

In some embodiments, the nanoparticles are not surface-modified. In some embodiments, the nanoparticles are surface-modified. The nanoparticles can be surface-modified to increase compatibility in the formulation from which the layer is formed. The nanoparticles can also be surface-modified such that they bond to the binder chemically and/or physically. In the former case, the surface-modified nanoparticles have functionality that chemically reacts with the binder. In general, surface modification can be carried out with surface-modifying agents such that the nanoparticles have hydrophobic and/or hydrophilic surfaces. Surface-modifying agents include silanes, organic acids and organic bases. Methods for surface-modifying nanoparticles are described in U.S. Provisional Appl. No. 61/294,610 (Wolk et al.) and references cited therein. In some embodiments, the nanoparticles comprise silica that has been surface-modified with a silane such as SILQUEST silanes available from GE Silicones.

The weight ratio of binder or polymerizable material to nanoparticles can range from about 30:70, 40:60, 50:50, 55:45, 60:40, 70:30, 80:20 or 90:10 or more depending on the desired properties of the nanovoided polymeric layer. The preferred ranges of wt % of nanoparticles range from about 10% by weight to about 60% by weight, and can depend on the density and size of the nanoparticle used.

The nanovoided polymeric layer can be prepared as described in U.S. Provisional Appl. No. 61/294,610 (Wolk et al.; filed Jan. 13, 2010) and references cited therein. In general, the nanovoided polymeric layer is formed by coating a solvent-containing polymeric or pre-polymeric solution on a substrate, followed by evaporation of the solvent under controlled conditions. If the solution comprises pre-polymeric components (e.g. monomers), then the components can be polymerized by appropriate means before, during or after solvent is removed. The amount of solvent in the coating solution can correlate to the void volume formed in the nanovoided polymeric layer. Coating solutions typically comprise anywhere from 10 to about 70 wt. % solvent. Various processing and post-processing steps may be carried out in the manufacture of nanovoided polymeric layers as described in Wolk et al.

In some embodiments, as described below, the nanovoided polymeric layer is microstructured such that the layer has a plurality of surface relief features, each feature having at least one dimension of less than about 1 mm, less than about 500 um, or from about 50 nm to about 500 um. Nanovoided polymeric layers can be microstructured by contacting the coating solution with a microstructured tool before solvent is removed. If curing is needed, the solution can be cured while in contact with the tool. In general, when a microstructured tool is used, the solution can be coated on a substrate and then contacted with the tool, or the solution can be contacted with the tool followed by the substrate. Details describing these variations are provided in Wolk et al.

The nanovoided polymeric layer can be microstructured such that the surface is in the form of refractive elements, for example, prisms, lenticular lenses, Fresnel elements or cylindrical lenses, any of which can form a regular linear or 2D array, or an irregular, pseudorandom, serpentine pattern or random array. In some embodiments, the microstructured surface imparts retroreflectivity or partial retroreflectivity, for example, the surface can comprise cube corner elements, diffractive elements such as a linear or 2D grating, diffractive optical elements, or holographic elements. The particular microstructure can be selected depending on the desired properties of the illumination device and depends upon the properties of any adjacent layers.

Many different types of solvents may be used depending on the polymeric or monomeric components in the coating solution and the desired properties of the nanovoided polymeric layer. The solvent may or may not be a mixture of solvents. The solvent may be polar and/or non-polar, and high or low boiling. Exemplary solvents include hydrocarbons, alcohols, ketones, glycol ethers, esters and water. Addenda may also be included in the coating solution such as tackifiers, plasticizers, UV absorbers and the like.

The support used in the formation of the nanovoided polymeric layer is not particularly limited and may be selected depending on the particular manufacturing process used to make the layer. For example, the support used in the formation of the nanovoided layer may allow light to be transmitted through it in order to cure coating solution disposed on the opposing side of the support. Exemplary supports include polyesters such as PET, polycarbonates, acrylics and methacrylics. The support used in the formation of the nanovoided polymeric layer may or may not be part of the optical article. That is, after the nanovoided polymeric layer is formed, support 130 can be removed or it can remain in place such that it is incorporated as a component of the optical article. In this latter case, the support has optical properties suitable for the intended application, as described below for substrates. Any of the substrates described below can be used as a support for formation of the nanovoided polymeric layer.

The nanovoided polymeric layer has particular haze properties depending on the intended use of the illumination device. In some embodiments, the nanovoided polymeric layer has a low optical haze not greater than about 5%, or not greater than about 4%, or not greater than about 3.5%, or not greater than about 3%, or not greater than about 2.5%, or not greater than about 2%, or not greater than about 1.5%, or not greater than about 1%. In some embodiments, the nanovoided polymeric layer has a high optical haze not less than about 40%, or not less than about 50%, or not less than about 60%, or not less than about 70%, or not less than about 80%, or not less than about 90%, or not less than about 95%. For light normally incident on the nanovoided polymeric layer, optical haze is defined as the ratio of the transmitted light that deviates from the normal direction by more than 4 degrees to the total transmitted light. Index of refraction values can be measured using a Metricon Model 2010 Prism Coupler (available from Metricon Corp.). Optical transmittance, clarity and haze can be measured using a Haze-Gard Plus haze meter (available from BYK-Gardiner).

The light source may comprise any suitable light source. Exemplary light sources include linear light sources such as cold cathode fluorescent lamps and point light sources such as light emitting diode (LEDs). Exemplary light sources also include organic light-emitting devices (OLEDs), incandescent bulbs, fluorescent bulbs, halogen lamps, UV bulbs, infrared sources, near-infrared sources, lasers, or chemical light sources. In general, the light emitted by the light source may be visible or invisible. At least one light source may be used. For example, from 1 to about 10,000 light sources may be used. The light source may comprise a row of LEDs positioned at or near an edge of the viscoelastic layer. The light source may comprise LEDs arranged on a circuit such that light emitted from the LEDs lights up continuously or uniformly the viscoelastic layer throughout a desired area. The light source may comprise LEDs that emit light of different colors such that the colors can mix within the viscoelastic layer. In this way, a graphic could be designed to appear differently at different times during its use. The light source may or may not contact the lightguide.

The light source may be powered by any suitable means. The light source may be powered using a battery, a DC power supply, an AC to DC power supply, an AC power supply, or a solar photovoltaic cell.

The optical article comprising the lightguide and the viscoelastic layer can be used in a variety of multilayer constructions depending on the particular application. Some of these embodiments are described herein. In general, an additional layer may be disposed on the nanovoided layer opposite the viscoelastic layer as shown in FIG. 4a, or on the lightguide opposite the viscoelastic layer as shown in FIG. 4b. Two additional layers may also be used in a variety of multilayer constructions, for example, as shown in FIG. 5b, first additional layer 526 may be disposed on the first nanovoided layer opposite the first viscoelastic layer, and/or second additional layer 529 may be disposed on the second nanovoided layer opposite the second viscoelastic layer.

The additional layer may comprise a polymer, metal, glass, ceramic, release liner, a graphic, paper, fabric, grease, antiseptic gel, or a combination thereof. The additional layer may comprise a multilayer optical film, a reflector, a mirror, a polarizer, a prismatic film, a three-quarter polarizer, a retroreflective film or a combination thereof.

In some embodiments, the additional layer comprises an optically clear substrate having high light transmittance of from about 80 to about 100%, from about 90 to about 100%, from about 95 to about 100%, or from about 98 to about 100% over at least a portion of the visible light spectrum. In some embodiments, the additional layer has a haze value of less than about 5%, less than about 3%, or less than about 1%. In some embodiments, the additional layer has a haze value of from about 0.01 to less than about 5%, from about 0.01 to less than about 3%, or from about 0.01 to less than about 1%.

In some embodiments, the additional layer comprises an optically clear substrate having high light transmittance and a low haze value. High light transmittance may be from about 90 to about 100%, from about 95 to about 100%, or from about 98 to about 100% over at least a portion of the visible light spectrum, and haze values may be from about 0.01 to less than about 5%, from about 0.01 to less than about 3%, or from about 0.01 to less than about 1%. In some embodiments, the additional layer is hazy and diffuses light, particularly visible light. A hazy layer or substrate may have a haze value of greater than about 5%, greater than about 20%, or greater than about 50%. A hazy layer or substrate may have a haze value of from about 5 to about 90%, from about 5 to about 50%, or from about 20 to about 50%. In some embodiments, the additional layer has low light transmittance, for example, from about 0.1 to about 70%, from about 0.1 to about 50%, or from about 0.1 to about 20%. In some embodiments, the additional layer may be translucent in that it reflects and transmits light.

The additional layer may have a refractive index in the range of from about 1.3 to about 2.6, 1.4 to about 1.7, or from about 1.5 to about 1.7. The particular refractive index or range of refractive indices used may depend on the overall design and intended use of the optical article or illumination device, e.g., the presence or absence of any additional components in contact with the additional layer.

In some embodiments, the additional layer comprises one or more viscoelastic materials as described above for the viscoelastic layer. In some embodiments, the additional layer comprises a PSA as described above for the viscoelastic layer. In some embodiments, the additional layer and the viscoelastic layer comprise viscoelastic materials. In some embodiments, the additional layer and the viscoelastic layer comprise PSAs. In some embodiments, the additional layer is not viscoelastic.

In some embodiments, the additional layer comprises an adhesive that is useful for adhering the optical article or illumination device to an article such as a dashboard of a vehicle or a painted wall. Useful adhesives include optically clear adhesives, optically diffuse adhesives, radiation cured adhesives, thermal cured adhesives, hot melt adhesives, cold seal adhesives, heat activated adhesives, adhesives that cure at room temperature and structural adhesives having an adhesive bond strength of at least about 6 MPa, and the like. Structural adhesives are available as 3M™ SCOTCH-WELD™ Adhesives.

In some embodiments, the additional layer comprises a polymer such as a polymeric film. Useful polymeric films include cellulose acetate, poly(meth)acrylate (acrylate and/or methacrylate), polyether sulfone, polyurethane, polyester, polycarbonate, polymethyl methacrylate, polyvinyl chloride, syndiotactic polystyrene, cyclic olefin copolymer, polyethylene terephthalate, polyethylene naphthalate, copolymer or blend based on naphthalene dicarboxylic acids, or some combination thereof. In some embodiments, the additional layer comprises a poly(meth)acrylate having a refractive index greater than that of the viscoelastic layer.

The additional layer may comprise a light emitting layer which emits light extracted from the viscoelastic layer. At least about 50% of light extracted from the viscoelastic layer may be emitted from the light emitting layer. An interface formed between the additional layer and the viscoelastic layer may comprise a plurality of features oriented to extract light from the viscoelastic layer. A surface of the additional layer may comprise a plurality of features oriented to emit light from the layer. The additional layer may comprise an imaged polymeric film. Light may be emitted uniformly, in one or more predetermined directions, or at different intensities from the additional layer. In some embodiments, the additional layer does not emit light.

In embodiments wherein the additional layer is a light emitting layer, several types of constructions may be employed. A translucent light emitting layer may comprise prismatic retroreflective sheeting, also known as cube corner sheeting and truncated cube corner sheeting. Prismatic retroreflective sheeting typically comprises a thin transparent layer having a substantially planar first surface and a second structured surface comprising a plurality of geometric structures, some or all of which include three reflective faces configured as a cube corner element. Exemplary prismatic retroreflective sheeting is described in WO 2010/48416 (Smith et al.); U.S. 2007/0242356 A1 (Thakkar et al.); U.S. Pat. No. 6,280,822 B1 (Smith et al.); and U.S. Pat. No. 5,784,197 (Frey et al.); all of which are incorporated herein by reference including references cited therein. Exemplary prismatic retroreflective sheeting is available as 3M™ Diamond Grade™ Reflective Sheeting and 3M™ Diamond Grade™ Fluorescent Reflective Sheeting, both from 3M™ Company.

A translucent light emitting layer may comprise beaded retroreflective sheeting comprising microspheres typically at least partially embedded in a binder layer and having associated specular or diffuse reflecting materials to retroreflect incident light. Exemplary beaded retroreflective sheeting is described in U.S. 2007/0110960 A1 (Frey et al.); U.S. Pat. No. 7,140,741 B2 (Fleming et al.); U.S. Pat. No. 5,066,098 (Kult et al.); EP 0 291 206 A1 (Kult et al.); WO 2007/075518 A1; and WO 2008/060731 A2 (Ko et al.); all of which are incorporated herein by reference including references cited therein.

Retroreflective sheeting described above, and in general, may be disposed on the viscoelastic layer such that either side/surface of the sheeting is adjacent the viscoelastic layer. These two constructions are referred to herein as "front lit" and "back lit". In some constructions, the reflective side of the retroreflective sheeting is adjacent the viscoelastic layer, and a layer of an optically transmissive film such as polymethylmethacrylate (for protection) is disposed on the opposite side of the viscoelastic layer. A reflector such as a specular reflector is disposed on the retroreflective sheeting opposite the viscoelastic layer. In some constructions, the side of the reflective film opposite the reflective side is adjacent the viscoelastic layer. A reflector may be disposed on the viscoelastic layer opposite the retroreflective sheeting. This particular construction may also be directly adhered to a substrate such as a vehicle, etc. (a substrate instead of the reflector).

In some embodiments, the additional layer comprises a reflector that reflects incident light being transported within the lightguide. In some embodiments, the reflector comprises a specular reflector wherein light propagating within the lightguide is reflected at a surface of the specular reflector according to the law of reflection. The law of reflection states that for light incident upon a surface and reflected by the surface, the reflection angle, $\theta_r$, is the same as or nearly the same as the incident angle, $\theta_i$, wherein both angles are defined relative to a plane of the surface. For a specular reflector, the reflection angle of light is within about 16° of the incident angle. A specular reflector may be fully or near fully specular as a reflector over some range of incident angles. Also, specular reflectors may be from about 85 to about 100% reflective, from about 90 to about 100%, or from about 95 to about 100%, across a particular region of the electromagnetic spectrum, for example, the visible region.

Suitable specular reflectors include mirrors such as a plane mirrors comprising a film of reflecting material, typically a metal, coated on glass. Suitable reflectors include mirrors that are multilayer optical films. Useful multilayer optical films comprise films having from about 10 to about 10,000 alternating layers of first and second polymer layers wherein the polymer layers comprise polyesters. Exemplary multilayer optical films are described in U.S. Pat. Nos. 5,825,543; 5,828,488 (Ouderkirk et al.); U.S. Pat. Nos. 5,867,316; 5,882,774; 6,179,948 B1 (Merrill et al.); U.S. Pat. Nos. 6,352,761 B1; 6,368,699 B1; 6,927,900 B2; 6,827,886 (Neavin et al.); U.S. Pat. No. 6,972,813 B1 (Toyooka); U.S. Pat. No. 6,991,695; 2006/0084780 A1 (Hebrink et al.); 2006/0216524 A1; 2006/0226561 A1 (Merrill et al.); 2007/0047080 A1 (Stover et al.); WO 95/17303; WO 95/17691; WO 95/17692; WO 95/17699; WO 96/19347; WO 97/01440; WO 99/36248; and WO 99/36262.

Exemplary specular reflectors include those available from 3M™ Company, for example, 3M™ High Intensity Grade Reflective Products such as High Reflective Visible Mirror Film and High Transmission Mirror Film, and Vikuiti™ films such as Vikuiti™ Enhanced Specular Reflector.

In some embodiments, the reflector comprises a diffuse reflector wherein light propagating within the lightguide is reflected and scattered at a surface of the diffuse reflector. For a diffuse reflector, light of a given incident angle reflects with multiple reflection angles wherein at least some of the reflection angles are greater than about 16° of the incident angle. A diffuse reflector may be fully or near fully reflective over some range of incident angles. Also, diffuse reflectors may be from about 85 to about 100% reflective, from about 90 to about 100%, or from about 95 to about 100%, across a particular region of the electromagnetic spectrum, for example, the visible region.

A diffuse reflector may comprise an irregular surface with respect to the wavelength of light being reflected. Light may be reflected at the surface. The diffuse reflector may comprise a layer of organic, inorganic or hybrid organic/inorganic particles disposed on a substrate. The particles may have a diameter of from greater than about 0.01 to about 100 um, from greater than about 0.05 to about 100 um, or from greater than about 0.05 to about 50 um. The particles may be polymeric particles, glass beads, inorganic particles, metal oxide particles, or hybrid organic/inorganic particles. The particles may be solid, porous or hollow. The particles may comprise microspheres having a polymeric shell with a blowing agent such as isobutene or isopentane inside the shell, for example, microspheres available as EXPANCEL microspheres from Expancel Co. The particles may be dispersed in a polymeric material or binder. Binders include one or more polymers and may be, for example, any of the viscoelastic materials and adhesive materials (cold seal adhesives, etc.) described above. The binder may comprise a PSA. The binder and particles may be coated onto a substrate such that the thickness of the binder is greater than, less than or about the same as the diameter of the particles. The substrate may comprise a polymer, metal, specular reflector, and the like.

For example, the diffuse reflector may comprise a layer of barium sulfate particles loaded in a polyethylene terephalate film. Other constructions that provide a reflective surface are described in U.S. Pat. No. 7,481,563 (David et al.) incorporated herein by reference.

In some embodiments, the binder is light transmissive such that at least some of the light incident upon the layer enters the layer and becomes diffused. This diffused light is reflected upon being incident on a substrate that is a reflector. The diffusive material may comprise particles dispersed in a binder as described above. The refractive indices of the particles and binder may be different. For example, the refractive indices of the particles and binder may differ from about 0.002 to about 1, or from about 0.01 to about 0.5. This type of diffuse reflector may be from about 85 to about 100% reflective, from about 90 to about 100%, or from about 95 to about 100%, across a particular region of the electromagnetic spectrum, for example, the visible region. Exemplary light diffusing materials are described in U.S. Pat. No. 6,288,172 B1 (Goetz et al.) incorporated herein by reference. For example, the particles may comprise hollow glass spheres having a mean diameter of about 18 um (SPHERICEL Grade 60P18 from Potters Industries Inc.), and the binder may comprise a PSA such as a silicone PSA.

In some embodiments, the additional layer comprises a multilayer optical film as described above. Other types of multilayer optical films may also be used, for example, the multilayer optical film may be a reflective film, a polarizer film, a reflective polarizer film, a diffuse blend reflective polarizer film, a diffuser film, a brightness enhancing film, a turning film, a mirror film, or a combination thereof. Exemplary multilayer optical films include 3M™ Vikuiti™ films available from 3M™ Company. Exemplary multilayer optical films are described in the references cited above for multilayer optical films that are mirrors.

In some embodiments, the additional layer comprises a polymeric film, metal, glass, ceramic, paper, fabric, or a combination thereof. In some embodiments, the additional layer comprises metal such as aluminum. In some embodiments, the additional layer comprises glass which generally comprises a hard, brittle, amorphous solid, including, soda-lime glass, borosilicate glass, acrylic glass, sugar glass, and the like. In some embodiments, the additional layer comprises a ceramic comprising some amount of crystalline structure and made, for example, from inorganic non-metallic materials. In some embodiments, the additional layer comprises paper, for example, paper made from cellulose pulp. In some embodiments, the additional layer comprises fabric, for example, leather, woven fabrics, non-woven fabrics.

Exemplary release liners have a low adhesion surface for contact with the adhesive layer. Release liners may comprise paper such as Kraft paper, or polymeric films such as poly (vinyl chloride), polyester, polyolefin, cellulose acetate, ethylene vinyl acetate, polyurethane, and the like. The release liner may be coated with a layer of a release agent such as a silicone-containing material or a fluorocarbon-containing material. Exemplary release liners include liners commercially available from CP Films Inc. under the trade designations "T-30" and "T-10" that have a silicone release coating on polyethylene terephthalate film. Exemplary release liners include structured release liners such as those which are microstructured. Microstructured release liners are used to impart a microstructure on the surface of an adhesive layer such as the microstructured surface described above for forming air release channels.

The thickness of the additional layer or light emitting layer is not particularly limited as long as the optical article can function as desired. The thickness of the layer may be selected based on or in conjunction with the viscoelastic layer, the lightguide, and/or the light source with which the optical article is used. The thickness of the layer may be limited by the overall thickness of the article in which the optical article is used. The thickness of the additional layer or light emitting layer may range from about 0.4 mil to about 1000 mil, from about 1 mil to about 300 mil, or from about 1 mil to about 60 mil.

The optical article may have any overall three-dimensional shape. As used herein, an overall three-dimensional shape refers to the size and shape of the article or layer without taking into account any light extracting and/or light emitting features on the surface of the article or layer, respectively. For example, the optical article may have an overall rectangular shape when viewed as a schematic cross section. The optical article may or may not be dependent on the particular application in which the article will be used. For example, if the optical article is used as a sign, then the overall three-dimensional shape of the optical article layer may be that of a layer or sheet. Other exemplary shapes of the optical article are described below. The same or different optical articles may be tiled or quilted together.

The lightguide may have any overall three-dimensional shape. For example, the lightguide when viewed as a schematic cross section has an overall rectangular shape. In general, the lightguide may have any overall three-dimensional shape which may be dependent on the particular application in which the optical article will be used. For example, if the optical article is used as a sign, then the overall three-dimensional shape of the lightguide may be that of a layer or sheet. Other exemplary shapes of the lightguide are described below for particular applications.

The viscoelastic layer and the additional layer or light emitting layer may also have any overall three-dimensional shapes. These layers may be the same size or nearly the same size as the lightguide, they may be different sizes where one of the layers is the same size as the lightguide. Each of the lightguide, viscoelastic layer, and the additional layer or light emitting layer may have a different size. Again, other exemplary shapes of the lightguide, the viscoelastic layer, and the additional layer or light emitting layer are described below for particular applications. Exemplary three-dimensional shapes of the optical article are also described below for particular applications.

In some embodiments, the additional layer comprises an adhesive layer so that the optical article can be adhered to a variety of surfaces for different applications as described herein. Suitable adhesives include optically clear PSAs, optically diffuse PSAs such as those described above, radiation cured adhesives, hot melt adhesives, cold seal adhesives, heat activated adhesives, structural adhesives having an adhesive bond strength of at least about 6 MPa, and the like. An adhesive layer may be used to adhere another substrate onto the lightguide, for example, an adhesive layer may be used to adhere a reflector to the lightguide.

In some embodiments, such as in FIG. 4b, additional layer 429 comprises a reflector, and a second additional layer which is an adhesive layer, is disposed on the reflector opposite the lightguide. The optical article can then be adhered to a variety of substrates for different applications as described herein. Suitable adhesives include any of those described herein. A release liner as described below may be disposed on this adhesive layer and removed before application to the substrate.

Additional layer 429 may also comprise a multilayer optical film, a reflector, a mirror, a polarizer, a prismatic film, a three-quarter polarizer, a retroreflective film, polymer, metal, glass, ceramic, a graphic, paper, fabric or a combination thereof. Additional layer 429 may emit light extracted from the lightguide, for example, at least about 50% of light extracted from the lightguide may be emitted from the additional layer. Less than about 10% of light that enters the lightguide may be extracted from the lightguide and into the additional layer. An interface formed between the lightguide and the additional layer may comprise a plurality of features oriented to extract light from the lightguide. A surface of the additional layer may comprise a plurality of features oriented to emit light from the additional layer. The additional layer may comprise an imaged polymeric film. Light may be emitted uniformly, in one or more predetermined directions, or at different intensities from the additional layer. The additional layer may not emit light.

The illumination device and optical article can comprise properties useful for embodiments shown in WO 2010/17087 (Sherman et al.). For example, the illumination device and article disclosed herein may be flexible as shown in FIGS. 15a and 15b of Sherman et al.

The optical article may provide an image as described for FIGS. 16a-16e. In some embodiments, the viscoelastic layer provides the image. In some embodiments, the additional layer provides the image. An image may be made by including or embedding different materials such as particles in regions of a layer wherein the regions are arranged to form an image. For example, the viscoelastic layer and/or the additional layer may comprise two different materials used to form regions arranged to form the image. For light being transported within the lightguide, some of the regions extract light and some reflect light. Selective extraction of light within a particular range of wavelengths can also be accomplished using pigments and dyes. The viscoelastic layer and/or the additional layer may comprise imaging materials instead of or in combination with the regions. An image may be made by depositing material on a surface of the viscoelastic layer and/or the additional layer may comprise wherein the material is arranged to form the image. An image may be made by depositing material between the additional layer and the viscoelastic layer wherein the material is arranged to form the image. An image may be made by structuring, as described above, a surface or an interface of the optical article.

The optical article may provide an image by having a graphic placed on a surface thereof. The graphic be imaged by having holes in it, e.g., by drilling through the graphic. Light emitting layers with different images can be exchanged at any time. For example, if the light emitting layer having an image is releasably attached to the viscoelastic layer, the light emitting layer can be easily removed, and replaced by another light emitting layer having a new image. In some embodiments, the optical article comprises a "double-sided graphic" as shown in FIGS. 17a and 17b of Sherman et al.

Imaging materials may be deposited in an image-wise manner by methods such as printing or marking, e.g., by inkjet printing, laser printing, electrostatic printing and the like. Images may be monochrome such as black and white images, or they may be colored images. Images may comprise one or more colors throughout, e.g., a uniform layer of color. Images that provide a general or custom surface may be used. For example, an image may be designed such that the optical article appears as plastic, metal, wood grain, fabric, leather, non-woven, etc. The image may also comprise white dots which may be disposed on a surface or interface. The white dots may be arranged as described for extraction features of conventional solid lightguides, e.g., as described in Kinder et al. Useful imaging materials include those that reflect all or some light within a particular range of wavelengths. Useful imaging materials include those that transmit all or some light within a particular range of wavelengths. Exemplary imaging materials include colorants such as pigments and dyes. Imaging materials may also comprise photonic crystals.

The optical articles may be made using any method or process commonly used for making multilayer constructions. Typical processes comprise those that are continuous processes such as continuous cast and cure, extrusion, microreplication, and embossing methods. Various types of radiation may be used for processes in which a material needs to be cured, e.g., crosslinked. Various types of chemistries, including those that do not require radiation, may be used for materials that need to be cured. If a layer or substrate is made from a curable material, then the material may be cured before, after or during contact with the light source. If a layer or substrate is made from a cured material, then the material may be cured before, after or during contact with other one or more layers or substrates. If a layer or substrate is made from a cured material, then the material may be cured using the light source either before, during or after they are optically coupled to the lightguide.

Conventional molding processes may also be used. Molds may be made by micro-machining and polishing of a mold material to create the desired features, structured surfaces, etc. Mold materials include polymeric, glass and metal materials. The molds may need to be suitable for making optically smooth surfaces. An optically smooth surface, if made from curable material, may be formed by simply allowing the material to cure in air or other atmosphere such that the material levels itself. Laser ablation may be used to structure a surface a layer or substrate or mold.

In some embodiments, each layer or substrate may be made separately, contacted and pressed together using finger pressure, a hand roller, an embosser or a laminator.

In some embodiments, a layer or substrate may be formed on another layer or substrate either separately or simultaneously. For example, a viscoelastic layer may be extruded simultaneously with a lightguide. Alternatively, a layer or substrate may be formed from curable materials and treated by heating and/or applying radiation, or a layer or substrate may be formed from solvent compositions and formed by removing the solvent.

In cases where the lightguide material or the viscoelastic material is curable, an optical article having a partially cured lightguide or viscoelastic layer, respectively, may be made. In cases where the lightguide material or the viscoelastic material is curable, chemically curing materials may be used such that the material is crosslinked. In cases where the lightguide material or the viscoelastic material is curable, the material may be cured before, after and/or during contact with another material or the light source.

In cases where the lightguide material or the viscoelastic material is curable using light, the light source may be optically coupled to the material and curing carried out by injecting light from the light source.

A layer or substrate may be used to structure a surface of the viscoelastic layer, e.g., the viscoelastic layer may not be structured by itself, rather, it becomes structured when contacted with a structured surface of a first substrate. It is also possible for the viscoelastic layer to have a structured surface such that it deforms a surface of a substrate to create a structured interface.

The optical article may be made using any suitable method including laminating, embossing, molding, casting, casting and curing, and the like. The optical article can be made using finger pressure if the viscoelastic layer comprises a PSA. The layers described herein may be made by melt-processing suitable polymers. The layers described herein may also be made by hardening or curing suitable compositions using radiation or chemical curing methods. If the viscoelastic layer is made from a radiation curable material, the optical article can be made using the pre-cured material which is subsequently cured. The radiation curable material may be cured using the light source to inject light into the light transport layer which is then extracted into the radiation curable layer.

The lightguide may be made by direct micro-machining to create the emitting feature(s) of a polymeric or glass piece. The lightguide may be made from a hardened material that has been melt processed or from a radiation-cured material. Cast and cure processes and conventional molding processes may be used. The optically smooth surface of the lightguide may also be made using any suitable machining method for polishing surfaces. The optically smooth surface of the lightguide, if made from radiation-curable materials, may be formed by simply allowing the material to cure in air or other atmosphere such that the material levels itself.

The optical articles and illumination devices may be provided in a form that can be sold to consumers. For example, illumination devices disclosed herein may be provided as lighting elements on the interior or exterior of automobiles that can be purchased by consumers. For another example, individual illumination devices may be sold to consumers for some specific or general use. For another example, individual optical articles and light sources may be sold together or separately to consumers for some specific or general use. For yet another example, the optical articles and illumination devices may be available in bulk form such as in strip, roll, or sheet form such that consumers may divide, cut, separate, etc. them into individual articles and illumination devices.

The optical articles and illumination devices disclosed herein may be provided in any number of ways. The optical articles and illumination devices may be provided as sheets or strips laid flat, or they can be rolled up to form a roll. The optical articles and illumination devices may be packaged as single items, or in multiples, in sets, etc. The optical articles and light sources may be provided in an assembled form, i.e., as an illumination device. The optical articles and light sources may be provided as kits wherein the two are separate from each other and assembled at some point by the user. The optical articles and light sources may also be provided separately such that they can be mixed and matched according to the needs of the user. The optical articles and illumination devices may be temporarily or permanently assembled to light up.

The optical articles and illumination devices may be provided in the form of items sold to commercial manufacturers or users. For example, illumination devices disclosed herein may be provided as lighting elements in instrument panel assemblies that can be purchased by automobile manufacturers or automobile repair shops. For another example, individual illumination devices may be sold to automobile manufacturers or automobile repair shops for assembly or repair of some specific part of an automobile. For another example, individual optical articles and light sources may be sold together or separately to automobile manufacturers or automobile repair shops for assembly or repair of some specific part of an automobile. For yet another example, the optical articles and illumination devices may be available in bulk form such as in strip, roll, or sheet form such that a manufacturer or other user may divide, cut, separate, etc. the form into individual articles and illumination devices.

The optical articles disclosed herein may be altered depending on a particular use. For example, the optical articles can be cut or divided by any suitable means, e.g., using a scissors or a die cutting method. A particularly useful die cutting method is described in WO 2009/131839 (Sherman et al.) incorporated herein by reference. The optical articles and illumination devices may be cut or divided into different shapes such as alphabetic letters; numbers; geometric shapes such as squares, rectangles, triangles, stars and the like.

The optical articles and illumination devices may be used for reading and general functioning within enclosed living spaces. The optical articles and illumination devices may be used for ambient lighting.

The optical articles and illumination devices may be used for signage such as for graphic arts applications. The optical articles and illumination devices may be used on or in windows, walls, wallpaper, wall hangings, pictures, posters, billboards, pillars, doors, floormats, vehicles, or anywhere signage is used. Signage may be single-sided or double-sided as described above.

The optical articles and illumination devices may be used for safety purposes wherever light is desired. For example, the optical articles and illumination devices may be used to illuminate one or more steps of a ladder, steps of a stairway, aisles such as in airplanes and movie theatres, walkways, egress, handrails, work zone identification signs and markings.

The optical articles and illumination devices may be used in a variety of items such as reading lights; party and holiday decorations such as hats, ornaments, string lighting, balloons, gift bags, greeting cards, wrapping paper; desk and computer accessories such as desk mats, mousepads, notepad holders, writing instruments; sporting items such as fishing lures; craft items such as knitting needles; personal items such as toothbrushes; household and office items such as clock faces, wall plates for light switches, hooks, tools.

The optical articles and illumination devices may be used on clothing and clothing accessories for decorative and/or safety purposes. For example, the optical articles and illumination devices may be used on outerwear for cyclists, or on clothing or headgear for miners. For another example, the optical articles and illumination devices may be used on or in straps and wristbands of watches, or on or in watch faces.

The optical articles and illumination devices may be used anywhere light is needed or desired. The optical articles and illumination devices may be disposed on a top surface of a shelf such that light from the article or device, respectively, is emitted in an upward direction. Likewise, the optical articles and illumination devices may be disposed on a bottom surface of a shelf such that light from the article or device, respectively, is emitted in a downward direction. The optical articles and illumination devices may also be disposed on or within a shelf having a light transmissive portion. The articles and devices may be arranged such that light is emitted from the light transmissive portion.

The optical articles and devices may be used as flashlights. For example, optical articles and illumination devices may be disposed on the outside or inside of a battery cover plate or other part of an electronic handheld device. The optical articles and illumination devices may or may not be hard-wired to the electronic device's battery but could have its own power source. The electronic device's battery cover may or may not be removable from the rest of the device comprising the display.

The optical articles and illumination devices may be used for vehicles such as automobiles, marine vehicles, buses, trucks, railcars, trailers, aircraft, and aerospace vehicles. The optical articles and illumination devices may be used on almost any surface of a vehicle including the exterior, interior, or any in-between surface. For example, the optical articles and illumination devices may be used to light up door handles on the exterior and/or interior of a vehicle. The optical articles and illumination devices may be used to illuminate trunk compartments, for example, they may be positioned on the underside of the trunk lid or inside the compartment. The optical articles and illumination devices may be used on bumpers, spoilers, floor boards, windows, on or as tail lights, sill plate lights, puddle lights, emergency flashers, center high mounted stop lights, or side lights and markers. The optical articles and illumination devices may be used to illuminate the inside of engine compartments, for example, they may be positioned on the underside of the hood, inside the compartment, or on an engine part.

The optical articles and illumination devices may also be used on the edge surfaces of vehicular doors between the exterior and interior panels of the doors. These optical articles and illumination devices may be used to provide a variety of information for the user, manufacturer, etc. The optical articles and illumination devices may be used to illuminate the instrument panel of a vehicle where lighted areas are typically displayed. The optical articles and illumination devices may be used on other interior items such as cupholders, consoles, handles, seats, doors, dashboards, headrests, steering wheels, wheels, portable lights, compasses, and the like. The optical articles and illumination devices may be used on back or pass areas for reading light or to provide ambient lighting for inside a vehicle.

The optical articles and illumination devices may be used in the manufacture of an item or as a replacement part of an item. For example, the optical articles and illumination devices may be sold to an automobile manufacturer or automobile repair shop for assembly or repair of some specific part of an automobile. An optical article or illumination device can be used in a tail light assembly being disposed behind the outside layer of the tail light which is typically red, yellow or clear plastic. The tail light may comprise a cavity with a light bulb or LED as a light source. An optical article or illumination device may be used in the cavity as a replacement for the light source. Alternatively, the tail light may not comprise a cavity or at least comprise a much smaller cavity than is used in today's automobiles. An optical article or illumination device may be disposed behind or within the outside layer of the tail light such that the overall size of the tail light is reduced.

The optical articles and illumination devices may be used for traffic safety such as for traffic signs, street signs, highway dividers and barriers, toll booths, pavement markings, and work zone identification signs and markings. The optical articles and illumination devices may be used on license plates for decoration, to provide information such as vehicle registration, etc. The optical articles and illumination devices may also be used to provide light near license plates such that the license plates are lit up from the side, top, etc.

The optical articles and illumination devices may be used with illumination devices comprising hollow light recycling cavities sometimes referred to as backlight assemblies or sign boxes. Backlight assemblies may be used for signage or general lighting. Exemplary backlight assemblies are disclosed in WO 2006/125174 (Hoffman et al.) and US 2008/0074901 (David et al.) all incorporated herein by reference. The optical articles and illumination devices disclosed herein may be used to replace the light sources described in these references.

The optical articles and illumination devices may be used on or in display devices such as cell phones, personal digital devices, MP3 players, digital picture frames, monitors, laptop computers, projectors such as mini-projectors, global positioning displays, televisions, etc. The optical articles may be used in place of conventional lightguides used to backlight a display panel of the display device. For example, the viscoelastic layer may be used to replace a solid or hollow lightguide that distributes light from one or more substantially linear or point light sources. The display device can be assembled without the need for adhesives to bond display components to the viscoelastic layer. Exemplary display devices include those having LCD and plasma display panels. Exemplary display devices are described in US 2008/232135 A1 (Kinder et al.) and U.S. Pat. No. 6,111,696 (Allen et al.)

The optical articles and illumination devices may be used for lighting buttons and keypads in various electronic devices including the display devices described above. In this case, the optical articles and devices are used in place of a conventional lightguide as described in U.S. Pat. No. 7,498,535 (Hoyle); U.S. 2007/0279391 A1 (Marttila, et al.), U.S. 2008/0053800 A1 (Hoyle), and U.S. Ser. No. 12/199,862 (Sahlin, et al.) all incorporated herein by reference.

The optical articles and illumination devices disclosed herein may be used with retroreflective sheeting. Optical articles and illumination devices used with retroreflective sheeting may be used in or on a variety of articles, e.g., road signs, street signs, cones, posts, barricades, guardrails, license plates, pavement markers, marking tape for work zone identification, linear delineation panels for concrete barriers and metal guardrails, shipboard markers (waterlines, pipes, etc.); on exterior, interior, or any in-between surfaces of vehicles as described herein. Retroreflective articles comprising the optical articles and illumination devices disclosed herein may be provided in any of the forms described herein.

The optical articles and illumination devices disclosed herein may be incorporated into security films or laminates. These security laminates are used to protect documents or packages to ensure that underlying items are not altered. Security laminates may be used to make driver licenses, passports, tamper proof seals and the like. Exemplary security film constructions are described in U.S. Pat. No. 5,510,171 (Faykish); U.S. Pat. No. 6,288,842 (Florczak et al.); and US 2010/103528 (Endle et al.) all incorporated herein by reference.

The optical articles and illumination devices may be used in the construction of an illuminated license plate. Useful optical articles include the front lit and back lit optical articles described in U.S. 2007/0006493 (Eberwein); U.S. 2007/0031641 A1 (Frisch et al.); U.S. 20070209244 (Prollius et al.); WO 2008/076612 A1 (Eberwein); WO 2008/121475 A1 (Frisch); WO 2008/016978 (Wollner et al.) and WO 2007/92152 A2 (Eberwein); all incorporated herein by reference. In these constructions, the lightguide is the lightguide and the viscoelastic layer may be disposed on either side the lightguide.

The optical articles and illumination devices described herein may be used for creating three-dimensional (3D) images in displays, buttons, keypads and the like. For example, 3D automotive displays and security laminates may be made. The optical articles and illumination devices may be used with microlens sheeting in which a composite image floats above or below the sheeting, or both. For example, the optical articles and illumination devices may be used with microlens sheetings described in U.S. Pat. No. 7,336,422 B2 (Dunn et al.), U.S. 2008/0130126 A1 (Brooks et al.), U.S. 2007/0081254 A1 (Endle et al.), U.S. 2007/0279391 A1 (Martilla et al.), and U.S. Application Ser. No. 61/078,971 filed on Jul. 8, 2008 (Gates et al.), U.S. Pat. No. 6,288,842 (Florczak et al.); and U.S. Ser. No. 12/257,223 (Endle et al.) incorporated herein by reference.

The optical articles and illumination devices may comprise an electrical circuit. For example, the first substrate may comprise an electrical circuit. The first substrate may also comprise a reflector which comprises an electrical circuit. The first substrate may also comprise a mirror which comprises an electrical circuit. The light source may be in electrical communication with the electrical circuit. The light source may comprise an array of multiple light sources. The viscoelastic layer can be formed onto the electrical circuit such that the light sources inject light into the viscoelastic layer throughout the entire area of the layer.
US 2008/0062688 (Aeling et al.);

The optical articles and illumination devices may be used in sensing/detecting devices wherein a sensor is disposed to receive light emitted from the viscoelastic layer. Also disclosed is a sensing/detecting device in which the light source is replaced with a sensor/detector. The sensor/detector can be a photodetector, a silicon photodiode, an IR detector, a solar cell, or an optoelectronic device, or some combination thereof.

The optical articles and illumination devices may be incorporated into a therapeutic device. For example, the optical articles and devices disclosed herein may be used in conformal patches for providing light therapy to tissue. Exemplary conformal patches are described in U.S. Pat. No. 6,096,066 (Chen et al.), incorporated herein by reference. Additional therapeutic devices are described in U.S. 2005/0070976 A1 (Samuel et al.); *Electronics World*, October 2007; and *LEDs Magazine*, November 2006; all of which are incorporated herein by reference.

The terms "in contact" and "disposed on" are used generally to describe that two items are adjacent one another such that the whole item can function as desired. This may mean that additional materials can be present between the adjacent items, as long as the item can function as desired.

What is claimed is:

1. An illumination device comprising:
    a light source; and
    an optical article comprising:
        a lightguide,
        a viscoelastic layer disposed on the lightguide, and
        a nanovoided polymeric layer disposed on the viscoelastic layer opposite the lightguide, the nanovoided polymeric layer comprising a plurality of interconnected nanovoids, at least some of the interconnected nanovoids connected to one another by hollow passages,
    wherein the light source is optically coupled to the lightguide such that light emitted by the light source enters the lightguide and is transported within the lightguide by total internal reflection.

2. The illumination device of claim 1, wherein the interconnected nanovoids have an average size of less than about 0.7 micron.

3. The illumination device of claim 1, wherein the nanovoided polymeric layer has an effective index of refraction of from about 1.15 to about 1.45.

4. The illumination device of claim 1, the nanovoided polymeric layer comprising a binder and a plurality of nanoparticles, wherein a weight ratio of the binder to the plurality of nanoparticles is greater than about 1:2, and a volume fraction of the interconnected nanovoids in the nanovoided polymeric layer is not less than about 20%.

5. The illumination device of claim 4, wherein the nanoparticles comprise reactive groups that are chemically bound to the binder.

6. The illumination device of claim 4, wherein the nanoparticles are not chemically bound to the binder.

7. The illumination device of claim 4, wherein the nanoparticles comprise elongated particles having an average aspect ratio that is not less than about 2.

8. The illumination device of claim 4, wherein the nanoparticles comprise spherical particles.

9. The illumination device of claim 1, the nanovoided polymeric layer further comprising beads having an average diameter of from about 0.01 to about 10 um.

10. The illumination device of claim 1, the nanovoided polymeric layer having an effective refractive index less than the refractive index of the viscoelastic layer.

11. The illumination device of claim 1, wherein an interface formed between the nanovoided polymeric layer and the viscoelastic layer comprises a plurality of features.

12. The illumination device of claim 1, wherein the optical article further comprises an additional layer disposed on the nanovoided polymeric layer opposite the viscoelastic layer.

13. The illumination device of claim 12, the additional layer comprising a multilayer optical film, a reflector, a mirror, a polarizer, a prismatic film, a three-quarter polarizer, a retroreflective film, polymer, metal, glass, ceramic, a graphic, paper, fabric or a combination thereof.

14. An illumination device comprising:
    a light source; and
    an optical article comprising:
        a lightguide,
        a first viscoelastic layer disposed on the lightguide,
        a second viscoelastic layer disposed on the lightguide opposite the first viscoelastic layer, and
        a first nanovoided polymeric layer disposed on the first viscoelastic layer opposite the lightguide, the first nanovoided polymeric layer comprising a first plurality of interconnected nanovoids, at least some of the interconnected nanovoids connected to one another by hollow passages,
    wherein the light source is optically coupled to the lightguide such that light emitted by the light source enters the lightguide and is transported within the lightguide by total internal reflection.

15. The illumination device of claim 14, the optical article further comprising a second nanovoided polymeric layer disposed on the second viscoelastic layer opposite the lightguide.

16. An illumination device comprising:
    a light source; and
    an optical article comprising:
        a lightguide optically coupled to the light source,
        a viscoelastic layer disposed on the lightguide, and
        a nanovoided polymeric layer disposed on the viscoelastic layer opposite the lightguide, the nanovoided polymeric layer comprising a plurality of interconnected nanovoids,
    wherein the interface formed between the viscoelastic layer and the nanovoided layer comprises a plurality of elongated prisms.

17. The illumination device of claim 16, the optical article further comprising a light emitting layer disposed on the lightguide opposite the viscoelastic layer, wherein an outer surface of the light emitting layer comprises a plurality of elongated lenses.

18. The illumination device of claim 17, wherein the elongated prisms extend orthogonal to the elongated lenses.

19. The illumination device of claim 17, the optical article further comprising a second viscoelastic layer disposed between the lightguide and the light emitting layer.

* * * * *